US012771591B2

(12) United States Patent
Gao et al.

(10) Patent No.: US 12,771,591 B2
(45) Date of Patent: Oct. 20, 2026

(54) SIGNAL TRANSMISSION METHOD AND APPARATUS

(71) Applicant: HUAWEI TECHNOLOGIES CO., LTD., Shenzhen (CN)

(72) Inventors: Kuandong Gao, Shenzhen (CN); Huang Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 112 days.

(21) Appl. No.: 18/911,358

(22) Filed: Oct. 10, 2024

(65) Prior Publication Data

US 2025/0039034 A1 Jan. 30, 2025

Related U.S. Application Data

(63) Continuation of application No. PCT/CN2023/086606, filed on Apr. 6, 2023.

(30) Foreign Application Priority Data

Apr. 11, 2022 (CN) ......................... 202210375535.1

(51) Int. Cl.
*H04L 27/36* (2006.01)

(52) U.S. Cl.
CPC .................................... *H04L 27/36* (2013.01)

(58) Field of Classification Search
CPC ............... H04L 27/36; H04L 27/26134; H04L 27/2636; H04L 27/2698; H04L 27/34
See application file for complete search history.

(56) References Cited

U.S. PATENT DOCUMENTS

2016/0056936 A1* 2/2016 Sun .................. H04L 27/26035 370/329
2021/0044372 A1* 2/2021 Yang .................. H04L 27/2613

OTHER PUBLICATIONS

Xiang Yu et al, "Power efficient dual-dependent pilots" channel estimation for filter bank multi-carrier with offset quadrature amplitude modulation, IET Communications, The Institution of Engineering and Technology, GB, vol. 13, No. 4, Mar. 5, 2019 (Mar. 5, 2019), XP006078318, total 8 pages.

(Continued)

*Primary Examiner* — Vineeta S Panwalkar

(57) ABSTRACT

A signal transmission method and an apparatus are provided. In the method, a transmit end determines a plurality of reference signals based on a combined reference signal, a combination manner, and an interference coefficient between different reference signals. The combined reference signal is obtained by combining the plurality of reference signals. The combination manner includes at least one processing manner of performing summation or difference calculation on the plurality of reference signals. The transmit end sends the plurality of reference signals. The plurality of reference signals includes a reference signal at a real signal position and a reference signal at an imaginary signal position. It can be learned that, when determining the plurality of reference signals, the transmit end considers at least one processing process of performing summation or difference calculation on the plurality of reference signals.

17 Claims, 12 Drawing Sheets

Signal transmission method 100

(56) References Cited

OTHER PUBLICATIONS

3GPP TS 38.211 V17.1.0 (Mar. 2022),3rd Generation Partnership Project; Technical Specification Group Radio Access Network;NR;Physical channels and modulation (Release 17), total 135 pages.

3GPP TS 38.214 V17.1.0 (Mar. 2022),3rd Generation Partnership Project; Technical Specification Group Radio Access Network;NR;Physical layer procedures for data (Release 17), total 225 pages.

* cited by examiner

Modulation: Modulation
Pulse shaping: Pulse shaping
Up-sampling: Up-sampling
Down sampling: Down sampling Modulation: Modulation
Pulse shaping: Pulse shaping
Real: Real part
Imag: Imaginary part
Up-sampling: Up-sampling
Down sampling: Down sampling
T/2 delay: T/2 delay

SIGNAL TRANSMISSION METHOD AND APPARATUS

CROSS-REFERENCE TO RELATED APPLICATIONS

This application is a continuation of International Application No. PCT/CN2023/086606, filed on Apr. 6, 2023, which claims priority to Chinese Patent Application No. 202210375535.1, filed on Apr. 11, 2022. The disclosures of the aforementioned applications are hereby incorporated by reference in their entireties.

TECHNICAL FIELD

The present disclosure relates to the field of communication technologies, and in particular, to a signal transmission method and an apparatus.

BACKGROUND

Currently, for a single-carrier offset quadrature amplitude modulation (SC-OQAM) signal, an SC-OQAM waveform carries a signal whose real part is separated from an imaginary part, in other words, an SC-OQAM waveform includes a real part signal and an imaginary part signal. In addition, a waveform of each signal in the SC-OQAM waveform is non-orthogonal to a next waveform that carries a signal. Therefore, in the SC-OQAM waveform, a real part signal at a real signal position causes interference to an imaginary part signal at an imaginary signal position, and the imaginary part signal at the imaginary signal position causes interference to the real part signal at the real signal position.

If impact of phase noise on a signal is not considered, when receiving the SC-OQAM signal, a receive end may extract only the real part signal when receiving the real part signal, and extract only the imaginary part signal when receiving the imaginary part signal, so that information can be correctly restored. However, there is phase noise in an actual communication system. To be specific, when a signal passes through a channel, the signal is affected by the phase noise. Therefore, a terminal device needs to estimate the phase noise by using a phase tracking reference signal (PTRS), and perform phase compensation, to restore information by using the signal.

Therefore, how to design a PTRS for OQAM modulation is still an urgent problem that needs to be studied currently.

SUMMARY

Embodiments of the present disclosure provide a signal transmission method and an apparatus, to reduce a peak to average power ratio PAPR of a signal.

According to a first aspect, an embodiment of the present disclosure provides a signal transmission method. In the method, a transmit end determines a plurality of reference signals based on a combined reference signal, a combination manner, and an interference coefficient between different reference signals. The combined reference signal is obtained by combining the plurality of reference signals. The combination manner includes at least one processing manner of performing summation or difference calculation on the plurality of reference signals. The transmit end sends the plurality of reference signals. The plurality of reference signals includes a reference signal at a real signal position and a reference signal at an imaginary signal position.

It can be learned that in this embodiment, when determining the plurality of reference signals, the transmit end considers at least one processing process of performing summation or difference calculation on the plurality of reference signals, so that each reference signal is determined by using interference energy caused by an interference coefficient between another reference signal and the reference signal, to reduce power of the reference signal and reduce average peak power PAPR of a system.

In an optional implementation, the combination manner includes performing combination processing on the plurality of reference signals based on a coding vector. When an element in the coding vector is 1, it indicates to perform summation processing on two adjacent reference signals in the plurality of reference signals; or when an element in the coding vector is −1, it indicates to perform difference calculation processing on two adjacent reference signals in the plurality of reference signals. It can be learned that a positive or negative value of the element in the coding vector determines whether to perform summation processing or difference calculation processing on the reference signals, so that at least one of summation processing and difference calculation processing may be performed on the plurality of reference signals based on the element in the coding vector, to obtain the combined reference signal.

In an optional implementation, the plurality of reference signals belongs to a same reference signal block. The same reference signal block includes consecutively placed reference signals, or includes adjacent reference signals. It can be learned that the plurality of reference signal blocks determined by the transmit end are a plurality of reference signals that belong to one reference signal block and that are consecutively placed or adjacent to each other.

In an optional implementation, a real part of a value of the combined reference signal and a real part of a value of interference to the combined reference signal have a same polarity. An imaginary part of the value of the combined reference signal and an imaginary part of the value of the interference to the combined reference signal have a same polarity. Having the same polarity means having a same positive or negative sign.

It can be learned that the real part of the value of the combined reference signal and the real part of the value of the interference to the combined reference signal have a same positive or negative sign. The imaginary part of the value of the combined reference signal and the imaginary part of the value of the interference to the combined reference signal have a same positive or negative sign. In this manner, a value of each reference signal in the plurality of determined reference signals can be low, to reduce power of the reference signal and reduce a PAPR of a system.

In an optional implementation, the real part of the value of the combined reference signal is a first preset value, and the imaginary part of the value of the combined reference signal is a second preset value; or an amplitude value of the real part of the value of the combined reference signal is a first preset value, and an amplitude value of the imaginary part of the value of the combined reference signal is a second preset value.

The first preset value and the second preset value are set by a network device, or reported by a terminal device, or predefined, or determined based on a modulation scheme, or determined based on a modulation and coding scheme (MCS).

It can be learned that after the plurality of reference signals are combined, both the real part and the imaginary part of the value of the combined reference signal are preset values, or both the amplitude value of the real part and the amplitude value of the imaginary part of the value of the combined reference signal are preset values, so that the transmit end can determine the combined reference signal based on the combination manner and the preset value.

In an optional implementation, both the reference signal at the real signal position and the reference signal at the imaginary signal position are complex signals. It can be learned that, the transmit end may further set all reference signals to complex signals. In this manner, power of the reference signal may be further reduced, thereby further reducing a PAPR of a system.

In an optional implementation, an amplitude value of an imaginary part signal in the complex signal at the real signal position and an amplitude value of a real part signal in the complex signal at the imaginary signal position are third preset values. It can be learned that both determined values of the imaginary part signal at the real signal position and the real part signal at the imaginary signal position are preset values.

In an optional implementation, the amplitude value of the imaginary-number signal in the complex signal at the real signal position and the amplitude value of the real-number signal in the complex signal at the imaginary signal position are set by the network device, or reported by the terminal device, or predefined, or determined based on the modulation scheme, or determined based on the modulation and coding scheme (MCS). That is, the third preset value may be flexibly determined in a plurality of manners.

In an optional implementation, the plurality of reference signals is offset quadrature amplitude modulation signals. In other words, the transmit end determines the plurality of offset quadrature amplitude modulation reference signals, so that the reference signal can have a reduced PAPR.

According to a second aspect, the present disclosure further provides a signal transmission method. The signal transmission method in this aspect corresponds to the signal transmission method in the first aspect, and the signal transmission method in this aspect is described from a receive end. In the method, the receive end receives a plurality of reference signals. The plurality of reference signals is determined based on a combined reference signal, a combination manner, and an interference coefficient between different reference signals. The combined reference signal is obtained by combining the plurality of reference signals. The combination manner includes at least one processing manner of performing summation or difference calculation on the plurality of reference signals. The receive end processes the plurality of reference signals based on the combination manner, to obtain the combined reference signal.

It can be learned that, in this embodiment, when the plurality of reference signals received by the receive end are determined, at least one processing process of performing summation or difference calculation on the plurality of reference signals is considered, so that each reference signal is determined by using interference energy caused by an interference coefficient between another reference signal and the reference signal. Therefore, each signal has low power, and the signal has a low PAPR. In this way, precision of phase noise estimation performed by the receive end based on the combined reference signal obtained based on the plurality of reference signals is improved.

In an optional implementation, the combination manner includes performing combination processing on the plurality of reference signals based on a coding vector. When an element in the coding vector is 1, it indicates to perform summation processing on two adjacent reference signals in the plurality of reference signals; or when an element in the coding vector is −1, it indicates to perform difference calculation processing on two adjacent reference signals in the plurality of reference signals. It can be learned that a positive or negative value of the element in the coding vector determines whether to perform summation processing or difference calculation processing on the reference signals, so that at least one of summation processing and difference calculation processing may be performed on the plurality of reference signals based on the element in the coding vector, to obtain the combined reference signal.

In an optional implementation, the plurality of reference signals belongs to a same reference signal block. The same reference signal block includes consecutively placed reference signals, or includes adjacent reference signals. It can be learned that the plurality of reference signal blocks received by the receive end are a plurality of reference signals that belong to one reference signal block and that are consecutively placed or adjacent to each other.

In an optional implementation, a real part of a value of the combined reference signal and a real part of a value of interference to the combined reference signal have a same polarity. An imaginary part of the value of the combined reference signal and an imaginary part of the value of the interference to the combined reference signal have a same polarity. Having the same polarity means having a same positive or negative sign.

It can be learned that the real part of the value of the combined reference signal and the real part of the value of the interference to the combined reference signal have a same positive or negative sign. The imaginary part of the value of the combined reference signal and the imaginary part of the value of the interference to the combined reference signal have a same positive or negative sign. In this manner, a value of each reference signal in the plurality of reference signals can be low, so that a PAPR of a system is low.

In an optional implementation, the real part of the value of the combined reference signal is a first preset value, and the imaginary part of the value of the combined reference signal is a second preset value; or an amplitude value of the real part of the value of the combined reference signal is a first preset value, and an amplitude value of the imaginary part of the value of the combined reference signal is a second preset value.

The first preset value and the second preset value are set by a network device, or reported by a terminal device, or predefined, or determined based on a modulation scheme, or determined based on a modulation and coding scheme (MCS).

It can be learned that both the real part and the imaginary part of the value of the combined reference signal combined based on the plurality of reference signals are preset values, or both the amplitude value of the real part and the amplitude value of the imaginary part of the value of the combined reference signal are preset values, so that the receive end can determine the combined reference signal based on the combination manner and the preset value.

In an optional implementation, both a reference signal at a real signal position and a reference signal at an imaginary signal position are complex signals. It can be learned that all of the reference signals received by the receive end may further be complex signals. In this manner, power of the reference signal may be further reduced, thereby further reducing a PAPR of a system.

In an optional implementation, an amplitude value of an imaginary part signal in the complex signal at the real signal position and an amplitude value of a real part signal in the complex signal at the imaginary signal position are third preset values. It can be learned that both values of the imaginary part signal at the real signal position and the real part signal at the imaginary signal position are preset values.

In an optional implementation, the amplitude value of the imaginary-number signal in the complex signal at the real signal position and the amplitude value of the real-number signal in the complex signal at the imaginary signal position are set by the network device, or reported by the terminal device, or predefined, or determined based on the modulation scheme, or determined based on the modulation and coding scheme (MCS). That is, the third preset value may be flexibly determined in a plurality of manners.

In an optional implementation, the plurality of reference signals is offset quadrature amplitude modulation signals. In other words, the receive end receives the plurality of offset quadrature amplitude modulation reference signals, so that a system can have a reduced PAPR.

According to a third aspect, the present disclosure further provides a communication apparatus. The communication apparatus has some or all functions of implementing the transmit end according to the first aspect, or has some or all functions of implementing the receive end according to the second aspect. For example, functions of the communication apparatus may have the functions of the transmit end according to some or all embodiments of the first aspect in the present disclosure, or may have a function of independently implementing any embodiment of the present disclosure. The function may be implemented by hardware, or may be implemented by hardware executing corresponding software. The hardware or the software includes one or more units or modules corresponding to the functions.

In an example embodiment, a structure of the communication apparatus may include a processing unit and a transceiver unit. The processing unit is configured to support the communication apparatus in performing a corresponding function in the foregoing method. The transceiver unit is configured to support communication between the communication apparatus and another communication apparatus. The communication apparatus may further include a storage unit. The storage unit is configured to be coupled to the processing unit and the transceiver unit, and stores program instructions and data that are necessary for the communication apparatus.

In an implementation, the communication apparatus includes a processing unit and a transceiver unit.

The processing unit is configured to determine a plurality of reference signals based on a combined reference signal, a combination manner, and an interference coefficient between different reference signals. The combined reference signal is obtained by combining the plurality of reference signals. The combination manner includes at least one processing manner of performing summation or difference calculation on the plurality of reference signals;

The transceiver unit is configured to send the plurality of reference signals. The plurality of reference signals includes a reference signal at a real signal position and a reference signal at an imaginary signal position.

In addition, for another optional implementation of the communication apparatus in this aspect, refer to related content of the first aspect.

In another implementation, the communication apparatus includes a processing unit and a transceiver unit.

The transceiver unit is configured to receive a plurality of reference signals. The plurality of reference signals is determined based on a combined reference signal, a combination manner, and an interference coefficient between different reference signals. The combined reference signal is obtained by combining the plurality of reference signals. The combination manner includes at least one processing manner of performing summation or difference calculation on the plurality of reference signals.

The processing unit is configured to process the plurality of reference signals based on the combination manner, to obtain the combined reference signal.

In addition, for another optional implementation of the communication apparatus in this aspect, refer to related content of the second aspect.

For example, the transceiver unit may be a transceiver or a communication interface, the storage unit may be a memory, and the processing unit may be a processor.

In an implementation, the communication apparatus includes a processor and a transceiver.

The processor is configured to determine a plurality of reference signals based on a combined reference signal, a combination manner, and an interference coefficient between different reference signals. The combined reference signal is obtained by combining the plurality of reference signals. The combination manner includes at least one processing manner of performing summation or difference calculation on the plurality of reference signals.

The transceiver is configured to send the plurality of reference signals. The plurality of reference signals includes a reference signal at a real signal position and a reference signal at an imaginary signal position.

In addition, for another optional implementation of the uplink communication apparatus in this aspect, refer to related content of the first aspect.

In another implementation, the communication apparatus includes a processor and a transceiver.

The transceiver is configured to receive a plurality of reference signals. The plurality of reference signals is determined based on a combined reference signal, a combination manner, and an interference coefficient between different reference signals. The combined reference signal is obtained by combining the plurality of reference signals. The combination manner includes at least one processing manner of performing summation or difference calculation on the plurality of reference signals.

The processor is configured to process the plurality of reference signals based on the combination manner, to obtain the combined reference signal.

In addition, for another optional implementation of the communication apparatus in this aspect, refer to related content of the second aspect.

In another implementation, the communication apparatus is a chip or a chip system. The processing unit may also be represented as a processing circuit or a logic circuit. The transceiver unit may be an input/output interface, an interface circuit, an output circuit, an input circuit, a pin, a related circuit, or the like on the chip or the chip system.

In an implementation process, the processor may be configured to perform, for example, but not limited to, baseband-related processing; and the transceiver may be configured to perform, for example, but not limited to, radio frequency receiving and sending. The foregoing components may be separately disposed on chips that are independent of each other, or at least some or all of the components may be disposed on a same chip. For example, the processor may be further divided into an analog baseband processor and a digital baseband processor. The analog baseband processor and a transceiver may be integrated on a same chip, and the digital baseband processor may be disposed on an independent chip. With continuous development of an integrated circuit technology, increasingly more components may be integrated on a same chip. For example, the digital baseband processor and a plurality of application processors (for example, but not limited to, a graphics processing unit and a multimedia processor) may be integrated on a same chip. The chip may be referred to as a system-on-a-chip (SoC). Whether the components are separately disposed on different chips or integrated and disposed on one or more chips usually depends on a requirement of a product design. This embodiment imposes no limitation on specific implementations of the foregoing components.

According to a fourth aspect, the present disclosure further provides a processor, configured to perform the foregoing methods. In a process of performing these methods, a process of sending the foregoing information and a process of receiving the foregoing information in the foregoing methods may be understood as a process of outputting the foregoing information by the processor and a process of receiving the foregoing input information by the processor. When outputting the information, the processor outputs the information to a transceiver, so that the transceiver transmits the information. After the information is outputted by the processor, other processing may further need to be performed on the information before the information arrives at the transceiver. Similarly, when the processor receives the input information, the transceiver receives the information, and inputs the information to the processor. Further, after the transceiver receives the foregoing information, other processing may need to be performed on the information before the information is input into the processor.

Based on the foregoing principle, for example, the sending a plurality of reference signals mentioned in the foregoing method may be understood as that the processor outputs a plurality of reference signals.

Unless otherwise specified, operations such as sending and receiving related to the processor may be more generally understood as operations such as output, receiving, and input of the processor if the operations do not conflict with actual functions or internal logic of the operations in related descriptions, instead of operations such as sending and receiving directly performed by a radio frequency circuit and an antenna.

In an implementation process, the processor may be a processor specially configured to perform these methods, or a processor, for example, a general-purpose processor, that executes computer instructions in the memory to perform these methods. The memory may be a non-transitory memory, for example, a read-only memory (ROM). The memory and the processor may be integrated on a same chip, or may be separately disposed on different chips. A type of the memory and a manner of disposing the memory and the processor are not limited in this embodiment.

According to a fifth aspect, the present disclosure further provides a communication system. The system includes at least one network device and at least one terminal device in the foregoing aspects. In another example embodiment, the system may further include another device that interacts with the network device and the terminal device in the solutions provided in the present disclosure.

According to a sixth aspect, the present disclosure provides a computer-readable storage medium, configured to store instructions. When the instructions are run by a computer, the method according to either the first aspect or the second aspect is implemented.

According to a seventh aspect, the present disclosure further provides a computer program product including instructions. When the computer program product runs on a computer, the method according to either the first aspect or the second aspect is implemented.

According to an eighth aspect, the present disclosure provides a chip system. The chip system includes a processor and an interface. The interface is configured to obtain a program or instructions. The processor is configured to invoke the program or the instructions to implement or support a transmit end in implementing a function in the first aspect, or is configured to invoke the program or the instructions to implement or support a receive end in implementing a function in the second aspect, for example, determining or processing at least one of data and information in the foregoing method. In an example embodiment, the chip system further includes a memory. The memory is configured to store program instructions and data that are necessary for a terminal. The chip system may include a chip, or may include a chip and another discrete component.

According to a ninth aspect, the present disclosure provides a communication apparatus including a processor, configured to execute a computer program or executable instructions stored in a memory. When the computer program or the executable instructions are executed, the apparatus is enabled to perform the method in the possible implementations of the first aspect and the second aspect.

In a possible implementation, the processor and the memory are integrated together.

In another possible implementation, the memory is located outside the communication apparatus.

For beneficial effects of the third aspect to the ninth aspect, refer to the beneficial effects of the first aspect or the second aspect.

BRIEF DESCRIPTION OF DRAWINGS

FIG. 2(*b*) is a diagram of another example communication scenario according to an embodiment of the present disclosure;

DESCRIPTION OF EMBODIMENTS

The following clearly and completely describes the technical solutions in embodiments of the present disclosure with reference to the accompanying drawings in embodiments of the present disclosure.

I. Communication System

To better understand a signal transmission method disclosed in embodiments of the present disclosure, a communication system to which embodiments of the present disclosure are applicable is described.

Figure 1:
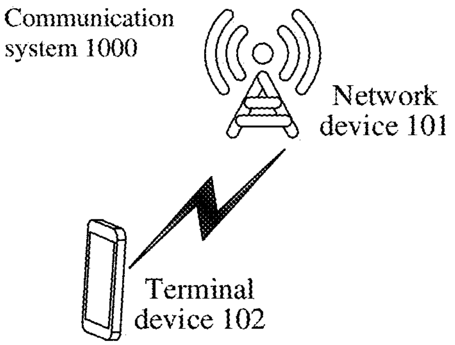
FIG. 1 is a diagram of an example structure of a communication system according to an embodiment of the present disclosure.

FIG. 1 is a diagram of a structure of a communication system 1000 according to an embodiment of the present disclosure. The communication system 1000 may include but is not limited to one network device 101 and one terminal device 102. Quantities and forms of devices shown in FIG. 1 are used as examples and do not constitute a limitation on embodiments of the present disclosure. During actual application, two or more network devices and two or more terminal devices may be included. The communication system shown in FIG. 1 is described by using an example in which there is one network device and one terminal device, and the network device 101 can provide a service for the terminal device 102.

The technical solutions in embodiments of the present disclosure may be applied to a wireless communication system such as a 5th generation (5G) mobile communication system, a satellite communication system, and a short range communication system. A wireless communication system mentioned in embodiments of the present disclosure includes but is not limited to: a narrowband internet of things (NB-IoT) system, a long term evolution (LTE) system, and an enhanced mobile broadband (eMBB), ultra-reliable low-latency communication (URLLC), and massive machine-type communication (mMTC) that are in three application scenarios of a 5G communication system. In addition, with continuous development of communication technologies, the system further includes a subsequently evolved communication system such as a 6th generation (6G) mobile communication system.

In embodiments of the present disclosure, the network device is an apparatus deployed in a radio access network to provide a wireless communication function for the terminal device. The network device may include various forms of macro base stations, micro base stations (also referred to as small stations), relay stations, access points, and the like. In systems using different radio access technologies, names of the network device may be different, and may be, for example, a base transceiver station (BTS) in a global system for mobile communications (GSM) or a code division multiple access (CDMA) network, a NodeB (NB) in wideband code division multiple access (WCDMA), and a NodeB (evolved NodeB, eNB or eNodeB) in the long term evolution (LTE) system. Alternatively, the network device may be a radio controller in a cloud radio access network (CRAN) scenario. Alternatively, the network device may be a base station device in a 5G network or a network device in a future evolved communication network. Alternatively, the network device may be a wearable device or a vehicle-mounted device. Alternatively, the network device may be a transmission reception point (TRP) or the like. This is not specifically limited in embodiments of the present disclosure.

The terminal device in embodiments of the present disclosure may include various handheld devices, vehicle-mounted devices, wearable devices, or computing devices that have a wireless communication function, or other processing devices connected to a wireless modem. The terminal may be a mobile station (MS), a subscriber unit, a cellular phone, a smartphone, a wireless data card, a personal digital assistant (PDA) computer, a tablet computer, a wireless modem, a handset, a laptop computer, a machine-type communication (MTC) terminal, or the like.

Figure 2A:
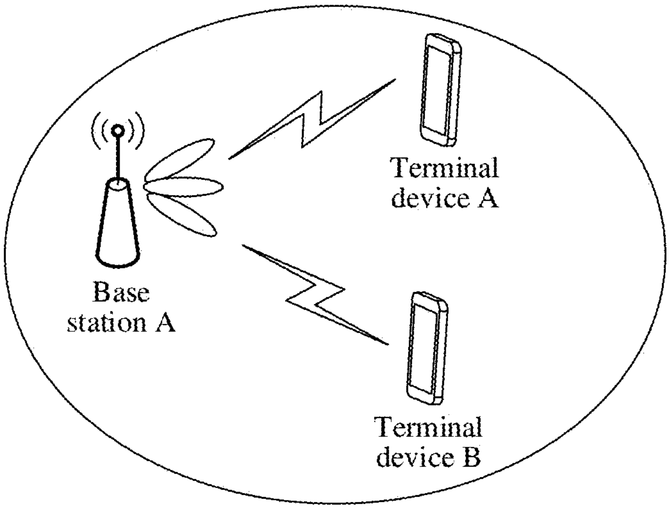
FIG. 2(*a*) is a diagram of an example communication scenario according to an embodiment of the present disclosure.
Figure 2B:
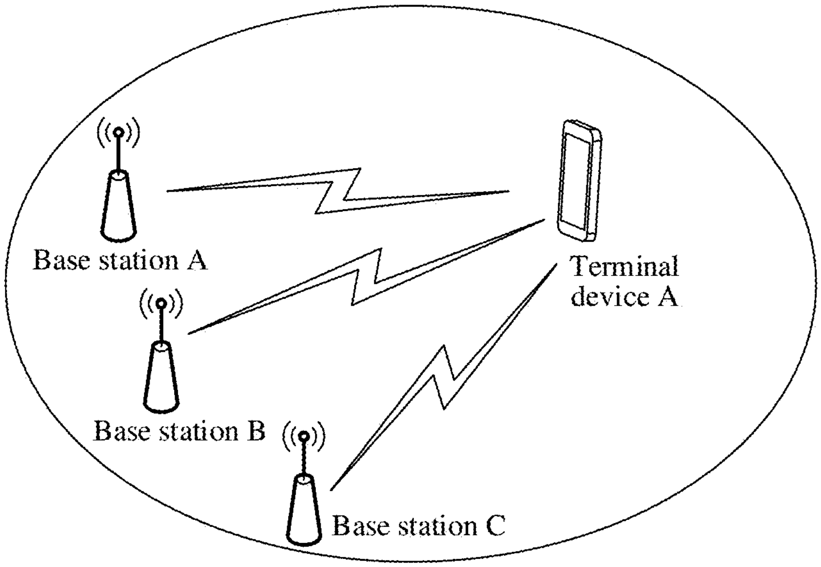

A communication scenario to which the present disclosure is applicable may be shown in FIG. 2(*a*) or FIG. 2(*b*). As shown in FIG. 2(*a*), the communication scenario includes one network device and a plurality of terminal devices. For example, the communication scenario includes a base station A, a terminal device A, and a terminal device B. In this scenario, the base station A may communicate with the terminal device A and the terminal device B by using a plurality of beams. Optionally, as shown in FIG. 2(*b*), the communication scenario includes a plurality of network devices and one terminal device. For example, the communication scenario includes a base station A, a base station B, a base station C, and a terminal device A. The base station A, the base station B, and the base station C may all communicate with the terminal device A. In the communication scenarios shown in FIG. 2(*a*) and FIG. 2(*b*), the base station may send a reference signal to the terminal device, or the terminal device may send a reference signal to the base station, so that a reference signal receive end analyzes the reference signal to estimate phase noise.

For ease of understanding of embodiments disclosed in the present disclosure, the following two points are described.

(1) In embodiments disclosed in the present disclosure, a scenario of a 5G new radio (NR) network in a wireless communication network is used as an example for description. It should be noted that solutions in embodiments disclosed in the present disclosure may be further applied to another wireless communication network, and a corresponding name may also be replaced with a name of a corresponding function in the another wireless communication network.

(2) Aspects, embodiments, or features of the present disclosure are presented in embodiments disclosed in the present disclosure by describing a system that includes a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

II. Introduction to Related Concepts

To better understand a signal transmission method disclosed in embodiments of the present disclosure, related concepts in embodiments of the present disclosure are briefly described.

1. Peak to Average Power Ratio (PAPR)

Figure 3:
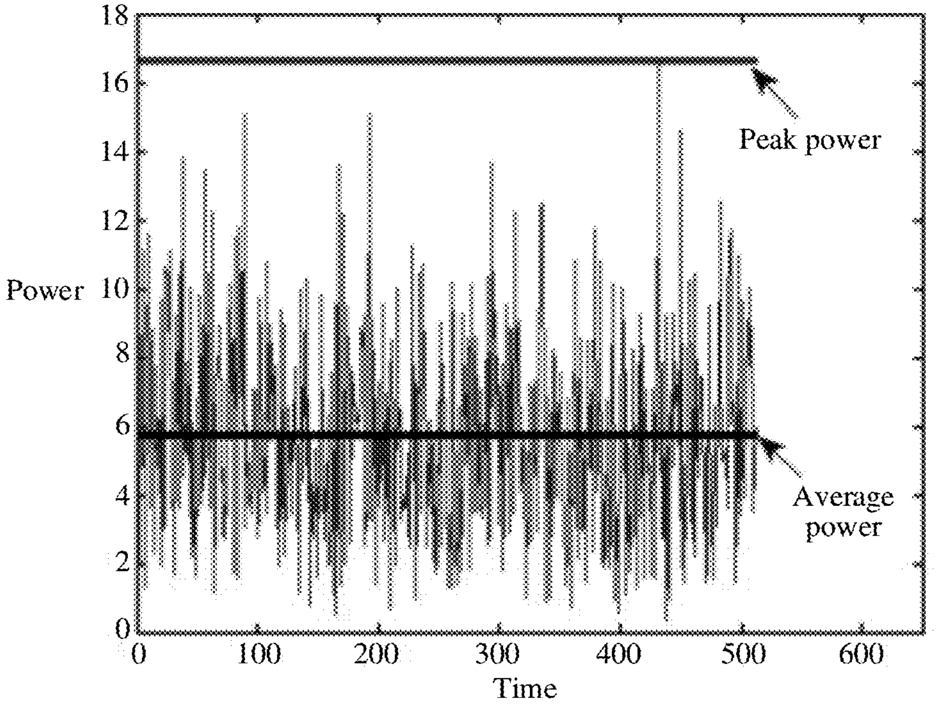
FIG. 3 is a diagram of an example signal power spectrum according to an embodiment of the present disclosure.

As shown in FIG. 3, from a perspective of a time domain, a radio signal is a sine wave whose amplitude is constantly changing, and the amplitude of the radio signal is not constant. A peak signal amplitude in one periodicity is different from a peak amplitude in another periodicity. Therefore, average power and peak power of the radio signal in each periodicity are different. Peak average power is maximum transient power of peak power at a preset probability (usually 1%) within specific time. The peak to average power ratio is a ratio of peak power to average power of a system.

The peak to average power ratio of the system is affected by two factors. First, the PAPR of the system is affected by a peak-to-average ratio of a baseband signal. A larger peak-to-average ratio of the baseband signal indicates a larger peak to average power ratio of the system. For example, a peak-to-average ratio of a 1024-quadrature amplitude modulation (QAM) baseband signal is large, so that the PAPR of the system is large. For another example, a peak-to-average ratio of a quadrature phase shift keying (QPSK) and binary phase shift keying (BPSK) modulation baseband signal is small, so that the PAPR of the system is small. Second, the PAPR of the system is affected by a peak-to-average ratio brought by power superposition of multiple carriers. When the peak-to-average ratio brought by the power superposition of the multiple carriers is large, the PAPR of the system is large.

Figure 4:
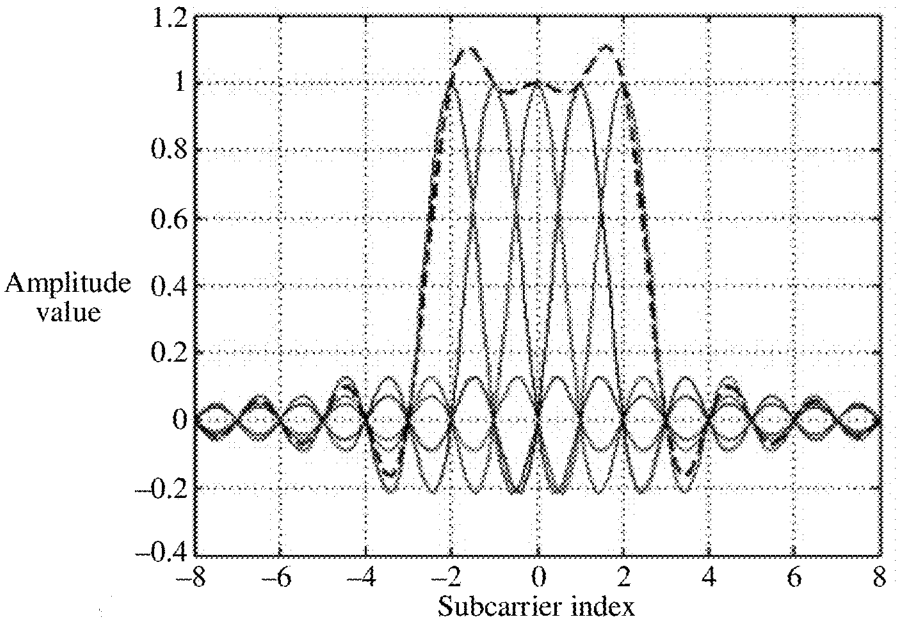
FIG. 4 is a diagram of an example multicarrier spectrum according to an embodiment of the present disclosure.

For example, in an orthogonal frequency division multiplexing (OFDM) system, a diagram of a multicarrier spectrum is shown in FIG. 4. It can be learned from FIG. 4 that a signal on each single carrier is represented as a sinc function, in other words, the signal has tails on two sides of a wave peak. Tails of a plurality of carriers may be superposed at a position to form a point with high peak power, and consequently, the PAPR of the system may be large.

2. Phase Noise and Phase Tracking Reference Signal (PTRS)

The phase noise is a random change that is of a system output signal phase and that is caused by various types of noise of a system (for example, various types of radio frequency components). The phase noise is related to a frequency multiplication factor of a signal. A larger frequency multiplication factor of the signal indicates larger phase noise caused to the signal. The phase noise severely affects performance of a to-be-estimated signal, and in particular, severely affects to-be-estimated performance of a high-frequency signal.

Impact of the phase noise on the signal may be expressed as follows:

$$y(n) = x(n)e^{j\theta_n} \tag{1}$$

x(n) is the signal, n=0, 1, . . . , N−1, and n is a time-domain sampling point. In other words, the phase noise is a random phase value generated at each sampling point n of the signal.

Figure 5:
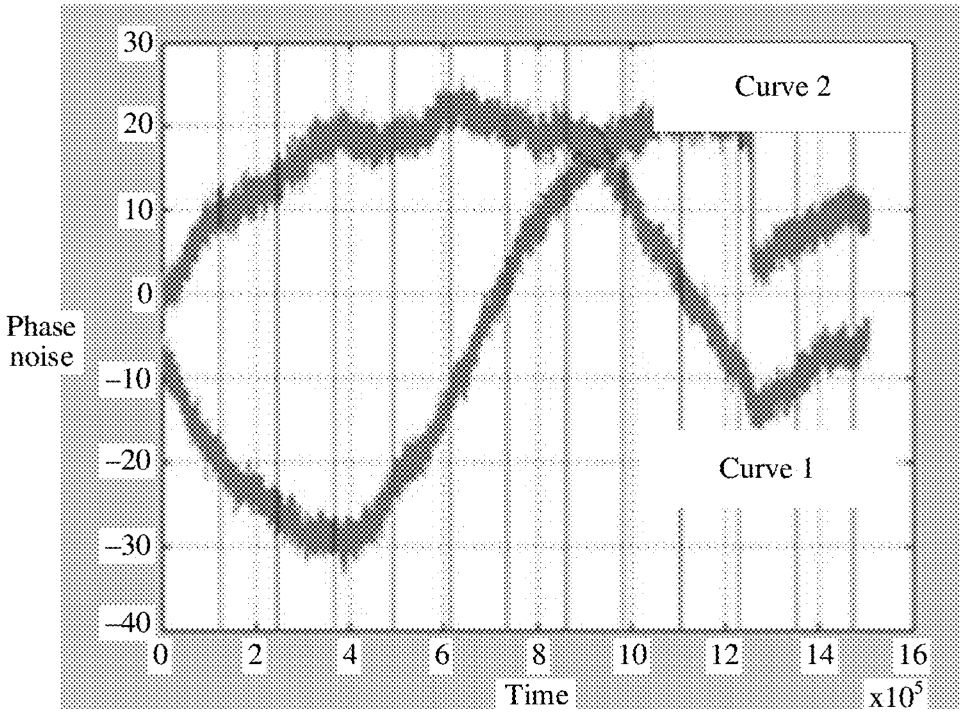
FIG. 5 is a diagram of an example curve in which a phase changes with time according to an embodiment of the present disclosure.

FIG. 5 is a diagram of a curve in which a phase changes with time within [−40, 30] degrees. In FIG. 5, a frequency of a signal represented by a curve 1 is higher than a frequency of a signal represented by a curve 2. It can be learned from FIG. 5 that, as a frequency band increases, phase noise power spectrum density is higher, causing greater impact on signal receiving. In other words, deterioration of the phase noise causes deterioration of demodulation performance.

Figure 6:
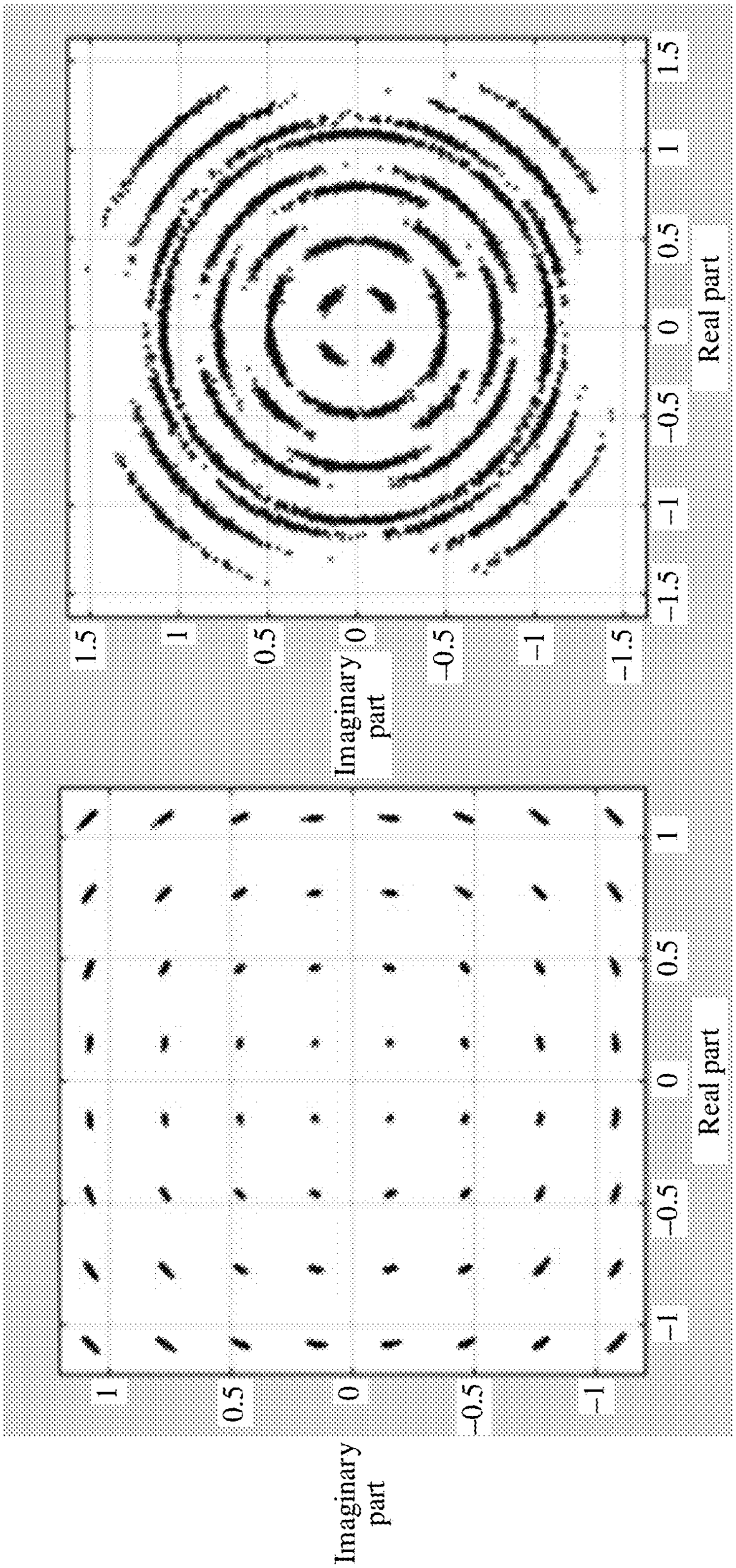
FIG. 6 is an example diagram of impact of phase noise on a Q value according to an embodiment of the present disclosure.

In an NR communication system, the PTRS is introduced to perform phase compensation, to improve demodulation performance in a phase noise condition. In FIG. 6, a right figure shows impact of the phase noise on system receiving performance when phase noise compensation is not performed, and a left figure shows impact of the phase noise on the system receiving performance after phase compensation is performed. It can be seen from FIG. 6 that, after phase compensation is performed on a signal, signal receiving performance of the signal is apparently improved. Currently, in uplink and downlink OFDM symbols in the protocol, PTRS configurations are the same, and configuration parameter ranges are the same. A PTRS configuration performed by a network device includes a frequency domain density configuration and a time domain density configuration.

PTRS time domain density is related to a modulation and coding scheme (MCS) index value of data. An MCS index value indication configured by the network device for a PTRS includes ptrs-MCS1, ptrs-MCS2, ptrs-MCS3, and ptrs-MCS4. As shown in Table 1, when an MCS index value Ives of the data is in different ranges, PTRS density used for the data is different. For example, when the MCS index value Ives of the data is greater than or equal to ptrs-MCS1 and less than ptrs-MCS2, PTRS time domain density corresponding to the data is 4, indicating that there is one PTRS on every four time domain symbols.

TABLE 1

| MCS index value | Time domain density |
|---|---|
| $I_{MCS}$ < ptrs-MCS1 | 0 |
| ptrs-MCS1 ≤ $I_{MCS}$ < ptrs-MCS2 | 4 |
| ptrs-MCS2 ≤ $I_{MCS}$ < ptrs-MCS3 | 2 |
| ptrs-MCS3 ≤ $I_{MCS}$ < ptrs-MCS4 | 1 |

As shown in Table 2, PTRS frequency domain density is related to a scheduling bandwidth of data. To be specific, when the scheduling bandwidth of the data belongs to different ranges, PTRS frequency domain density corresponding to the data is different. When a scheduling bandwidth $N_{RB}$ of the data is less than $N_{RB0}$, there is no PTRS in the data; or when a scheduling bandwidth $N_{RB}$ of the data is greater than or equal to $N_{RB0}$ and less than $N_{RB1}$, PTRS frequency density corresponding to the data is 2, indicating that there is one PTRS resource element in every two resource blocks (RBs) in the bandwidth; or when a scheduling bandwidth $N_{RB}$ of the data is greater than or equal to $N_{RB1}$, PTRS frequency density corresponding to the data is 4, indicating that there is one PTRS resource element in every four RBs in the bandwidth. Both $N_{RB0}$ and $N_{RB1}$ are configured by the network device.

TABLE 2

| Scheduling bandwidth of the data | Frequency domain density |
|---|---|
| $N_{RB} < N_{RB0}$ | 0 |
| $N_{RB0} \le N_{RB} < N_{RB1}$ | 2 |
| $N_{RB1} \le N_{RB}$ | 4 |

In an OFDM system, a PTRS block is further proposed for a PTRS of a discrete Fourier transform (DFT)-S-OFDM signal. The PTRS of the DFT-S-OFDM signal only has a frequency domain density configuration. As shown in Table 3, when the scheduling bandwidth of the data is greater than or equal to $N_{RB0}$ and less than $N_{RB1}$, the data corresponds to two PTRS blocks, and a quantity of PTRSs in each PTRS block is 2; or when the scheduling bandwidth of the data is greater than or equal to $N_{RB1}$ and less than $N_{RB2}$, the data corresponds to two PTRS blocks, and a quantity of PTRSs in each PTRS block is 4; or when the scheduling bandwidth of the data is greater than or equal to $N_{RB2}$ and less than $N_{RB3}$, the data corresponds to four PTRS blocks, and a quantity of PTRSs in each PTRS block is 2; or when the scheduling bandwidth of the data is greater than or equal to $N_{RB3}$ and less than $N_{RB4}$, the data corresponds to four PTRS blocks, and a quantity of PTRSs in each PTRS block is 4; or when the scheduling bandwidth of the data is greater than or equal to $N_{RB4}$, the data corresponds to eight PTRS blocks, and a quantity of PTRSs in each PTRS block is 4. $N_{RB0}$, $N_{RB1}$, $N_{RB2}$, $N_{RB3}$, and $N_{RB4}$ are all configured by the network device.

TABLE 3

| Scheduling bandwidth of the data | Quantity of PTRS blocks | Quantity of PTRSs in a PTRS block |
|---|---|---|
| $N_{RB0} \le N_{RB} < N_{RB1}$ | 2 | 2 |
| $N_{RB1} \le N_{RB} < N_{RB2}$ | 2 | 4 |
| $N_{RB2} \le N_{RB} < N_{RB3}$ | 4 | 2 |
| $N_{RB3} \le N_{RB} < N_{RB4}$ | 4 | 4 |
| $N_{RB4} \le N_{RB}$ | 8 | 4 |

3. Cyclic Prefix (CP)-Orthogonal Frequency Division Multiplexing (OFDM) Signal and DFT-S-OFDM Signal CP-OFDM signal: The CP-OFDM signal is a signal obtained by mapping a modulated symbol to a frequency domain subcarrier, performing inverse discrete Fourier transform on the modulated symbol, and adding a cyclic prefix to a transformed signal.

Figure 7:
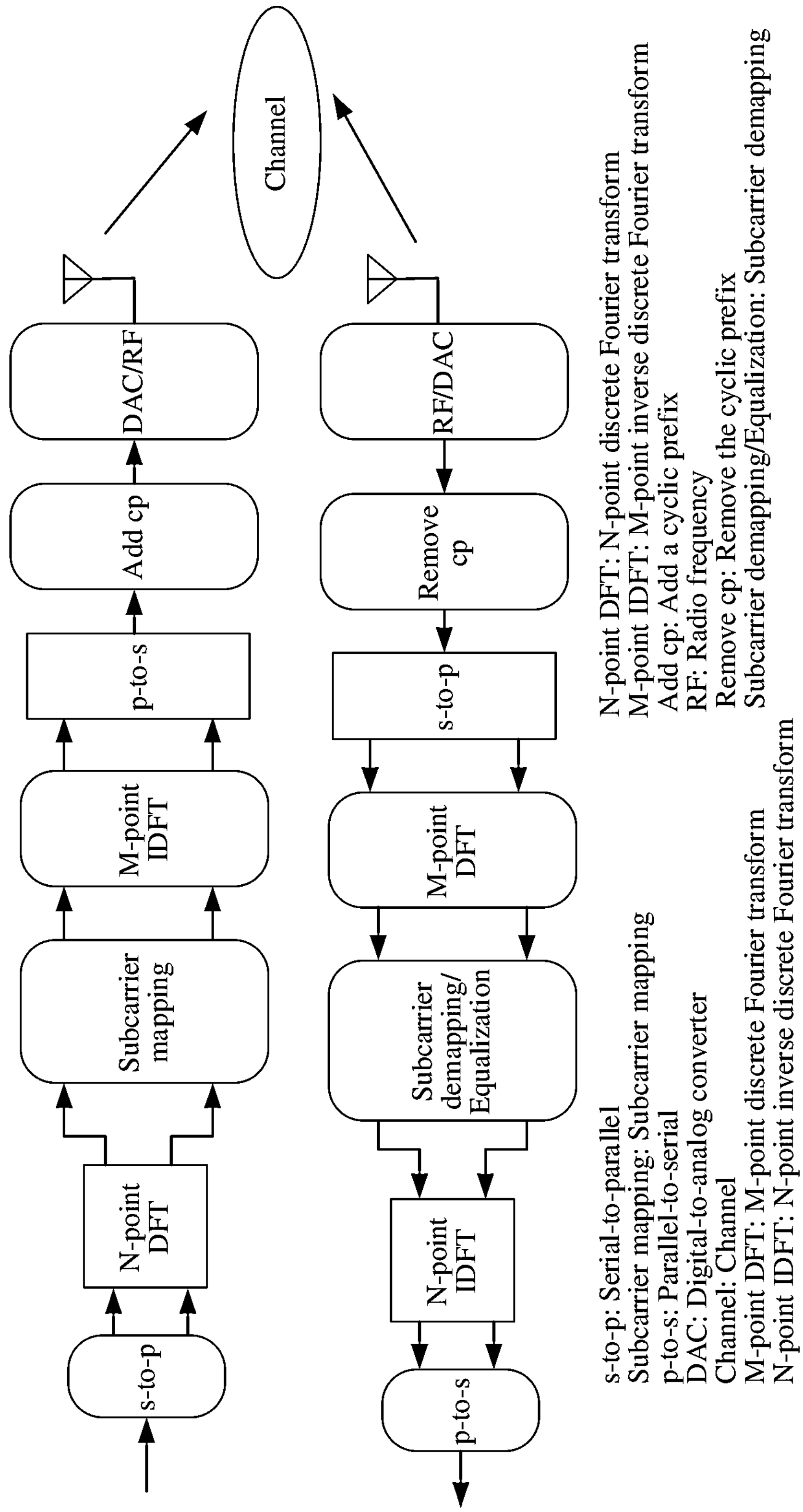
FIG. 7 is an example diagram of generating and receiving a signal according to an embodiment of the present disclosure.

DFT-S-OFDM signal: The DFT-S-OFDM signal is a signal obtained by transforming the CP-OFDM signal. FIG. 7 is a diagram of generating and receiving the DFT-S-OFDM signal. A transmit end performs serial-to-parallel (s-to-p) mapping on a specific quantity of modulated symbols, and then performs N-point discrete Fourier transform (DFT) (N-point DFT). After transforming the modulated symbol to a frequency domain signal, the transmit end performs filtering processing on the frequency domain signal, or directly maps the frequency domain signal to a frequency domain subcarrier without performing filtering processing, that is, performs subcarrier mapping. The transmit end then performs M-point inverse discrete Fourier transform (M-point IDFT) and parallel-to-serial (p-to-s) mapping on the signal. Finally, the transmit end adds a cyclic prefix (add CP) to obtain the sent DFT-S-OFDM signal. Therefore, the transmit end sends the DFT-S-OFDM signal by using a digital-to-analog converter (DAC) or a radio frequency (radio frequency, RF) component.

After receiving the signal through the RF or the ADC, a receive end removes the CP of the received signal, performs s-to-p transform, then performs M-point DFT transform, and performs subcarrier demapping or equalization processing. The receive end performs N-point inverse discrete Fourier transform (IDFT) and p-to-s transform, and then inputs an obtained signal to a detector for detection.

The DFT-S-OFDM signal is still a single carrier. Therefore, compared with the CP-OFDM signal, a PAPR of the DFT-S-OFDM signal is lower than a PAPR of the CP-OFDM signal. However, broadband signals in high-frequency communication, for example, a CP-OFDM signal and a DFT-S-OFDM signal, each have a large PAPR. Consequently, a power component is severely distorted due to excessively high transmit power. Therefore, to reduce transmit power of the signal, the high-frequency communication requires a waveform with a low PAPR. A PAPR of a single-carrier quadrature amplitude modulation (SC-OQAM) signal is low, and the signal may be used for the high frequency communication.

Figure 8:
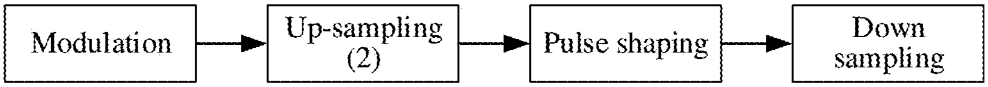
FIG. 8 is a block diagram of an example time domain implementation of an SC-QAM signal according to an embodiment of the present disclosure.

4. Single-Carrier Amplitude Modulation (SC-QAM) Signal and SC-OQAM Signal 4.1. Time Domain Implementations of the SC-QAM Signal and the SC-OQAM Signal FIG. 8 is a block diagram of the time domain implementation of the SC-QAM signal at the transmit end. The transmit end modulates data information (to be specific, coded 0 and 1 information) into a modulation signal. The modulation signal may be a QAM modulation signal, a phase modulation signal, or another modulation signal. The transmit end then performs up-sampling twice on the modulation signal, to repeat the modulated symbol. The transmit end performs pulse shaping, and then performs down-sampling on a filtered signal, to obtain the SC-QAM signal. The pulse shaping refers to filtering the signal by using a filter, and the down-sampling refers to extracting the signal.

Figure 9:
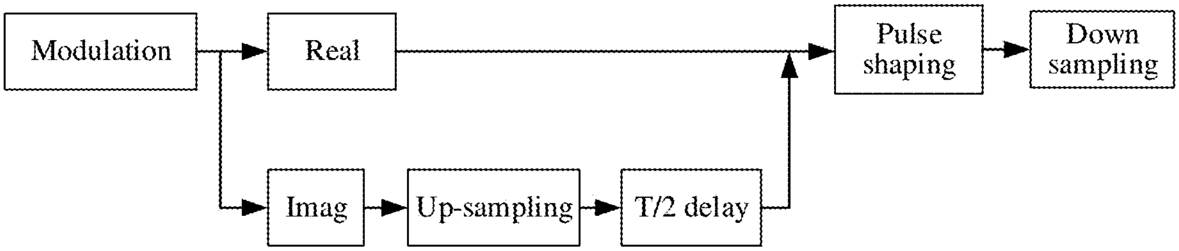
FIG. 9 is a block diagram of an example time domain implementation of an SC-OQAM signal according to an embodiment of the present disclosure.

FIG. 9 is a block diagram of the time domain implementation of the SC-OQAM signal at the transmit end. It can be learned through comparison with FIG. 8 that, different from the time domain implementation of the SC-OQAM signal, in the time domain implementation of the SC-QAM signal, the transmit end separates a real part from an imaginary part for a complex modulation signal, and delays a real part signal by T/2. Other implementation steps are the same.

Figure 10:
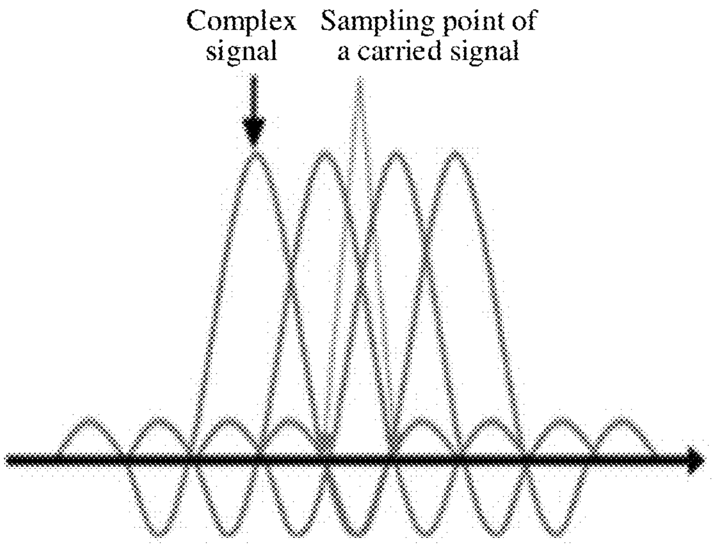
FIG. 10 is a diagram of an example waveform of an SC-QAM signal according to an embodiment of the present disclosure.

The following compares the two signals in terms of waveforms of the SC-QAM signal and the SC-OQAM signal. The waveform of the SC-QAM signal is shown in FIG. 10, and the SC-QAM signal carries a complex signal. If each SC-QAM signal is zero at a sampling point of a signal carried in a next SC-QAM waveform, the SC-QAM waveform is orthogonal to another SC-QAM waveform.

Figure 11:
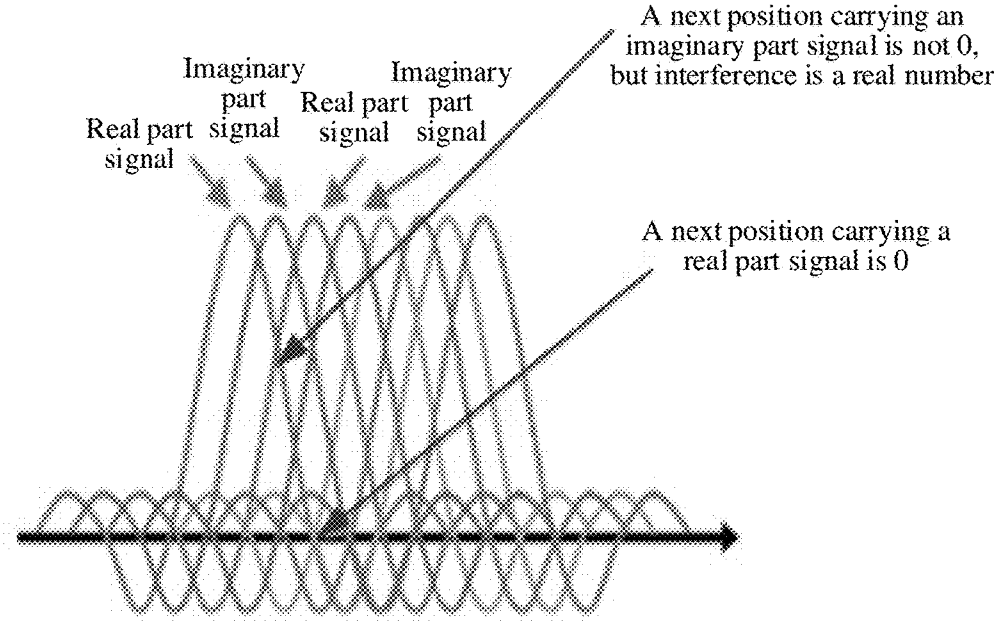
FIG. 11 is a diagram of an example waveform of an SC-OQAM signal according to an embodiment of the present disclosure.

The waveform of the SC-OQAM signal is shown in FIG. 11. Each SC-OQAM waveform carries a real part signal and an imaginary part signal. A real part signal is not 0 at a position carrying an adjacent imaginary part signal. Therefore, a waveform between the real part signal and the adjacent imaginary part signal is in a non-orthogonal relationship. Similarly, a waveform between an imaginary part signal and an adjacent real part signal is also in a non-orthogonal relationship. However, a real part signal is 0 at a position carrying an adjacent real part signal. Therefore, a waveform between the real part signal and the adjacent real part signal is in an orthogonal relationship. Similarly, a waveform between an imaginary part signal and an adjacent imaginary part signal is in an orthogonal relationship.

In addition, in the SC-OQAM signal, a wave peak of the real part signal is superimposed with a non-wave peak of the imaginary-number signal, and a wave peak of an imaginary part waveform is superimposed with a non-wave peak of the real-number signal, so that transmit power of the signal can be reduced, thereby reducing the PAPR of the system. It can be learned that the SC-OQAM signal has a low PAPR.

4.2. Frequency Domain Implementation of the SC-OQAM Signal

Figure 12:
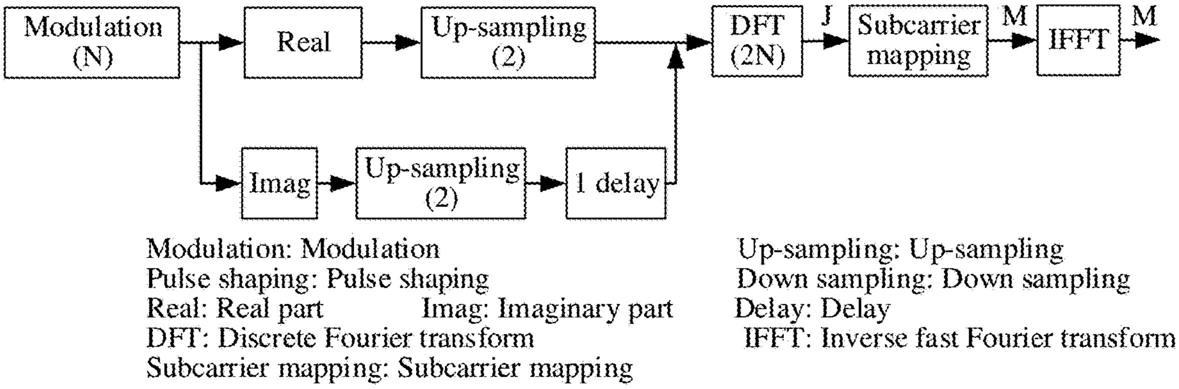
FIG. 12 is a block diagram of an example frequency domain implementation of an SC-OQAM signal according to an embodiment of the present disclosure.

FIG. 12 is a block diagram of the frequency domain implementation of the SC-OQAM signal at the transmit end. The transmit end splits a QAM constellation point used in the OFDM system into a real part and an imaginary part, or directly defines an input pulse amplitude modulation (PAM) signal. Then, the transmit end performs up-sampling processing twice on the signal, to be specific, changes a real part signal to [X, 0, X, 0, X, 0, . . . ], changes an imaginary part signal to [jY, 0, jY, 0, jY, 0, . . . ], and performs a delay on the imaginary part signal, so that the imaginary part signal changes to [0, jY, 0, jY, 0, jY, . . . ]. After the real part signal and the imaginary part signal are combined, the signal changes to [X, jY, X, jY, X, jY, . . . ]. It can be learned that a total length of the signal is twice that of an original complex modulation signal. Then, the transmit end performs 2N-point DFT transform on a symbol obtained by performing phase rotation or real and imaginary part separation, to transform a time domain signal into a frequency domain signal.

Figure 13:
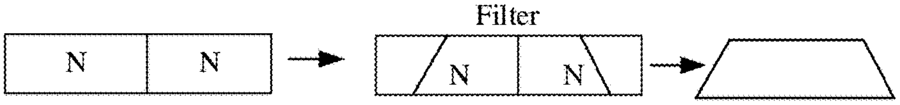
FIG. 13 is an example diagram of performing frequency domain filtering on a signal according to an embodiment of the present disclosure.

After the transmit end splits the QAM constellation point into the real part and the imaginary part, the length of the signal is twice that of conventional QAM constellation modulation, and therefore, a quantity of points of DFT transform is also twice a quantity of points of DFT transform of the QAM constellation modulation. Therefore, there is redundant data obtained by the transmit end by performing DFT transform, and the transmit end may perform truncated frequency domain filtering on a redundant signal. FIG. 13 is a diagram of performing frequency domain filtering by the transmit end. Truncation means that a bandwidth of a filter is less than a bandwidth obtained through DFT. For example, the bandwidth obtained through DFT transform includes 100 resource blocks, and the transmit end may design a length of a frequency domain filter to 60 resource blocks. A filtering process is that the frequency domain filter is directly multiplied by a signal obtained through DFT transform. A length of the filter may be 2N, and some values are 0. Because the signal is redundant, truncated filtering does not cause a performance loss. Finally, the transmit end adds a CP after performing zero padding to perform M-point IFFT transform, to obtain the sent SC-OQAM signal.

It can be learned that, regardless of whether the SC-OQAM signal is generated by the transmit end in time domain or in frequency domain, the SC-OQAM signal may be considered as a common input signal, and is a signal whose real part is separated from an imaginary part and that is of [X, jY, X, jY, X, jY, . . . ] or [jY, X, jY, X, jY, X . . . ]. Therefore, when receiving the real-number signal in the SC-OQAM signal, the receive end discards the imaginary part signal; or when receiving the imaginary part signal in the SC-OQAM signal, the receive end discards the real part signal, so that information can be restored.

However, there is phase noise in an actual communication system. To be specific, when a signal passes through a channel, the signal is affected by the phase noise. A terminal device needs to estimate the phase noise by using a PTRS, and perform phase compensation, to restore information by using the signal. Therefore, how to design a PTRS for OQAM modulation is still a problem that urgently needs to be studied currently.

In embodiments of the present disclosure, a position at which the transmit end sends the imaginary part signal in the SC-OQAM signal is an imaginary signal position, and a position at which the transmit end sends the real part signal in the SC-OQAM signal is a real signal position. For the position, when SC-OQAM signals are arranged in sequence, if an imaginary signal is placed at an even-number index position, the even-number index position is a position of the imaginary part signal, and is also referred to as an imaginary signal position; and if a real signal is placed at an odd-number index position, the odd-number index position is a position of the real part signal, and is also referred to as a real signal position. If an imaginary signal is placed at an odd-number index position, the odd-number index position is a position of the imaginary part signal, and is also referred to as an imaginary signal position; and if a real signal is placed at an even-number index position, the even-number index position is a position of the real part signal, and is also referred to as a real signal position.

In embodiments of the present disclosure, the transmit end may be a terminal device, or may be a network device. When the transmit end is a terminal device, the receive end is a network device; or when the transmit end is a network device, the receive end is a terminal device.

3. Method Embodiment

Figure 14:
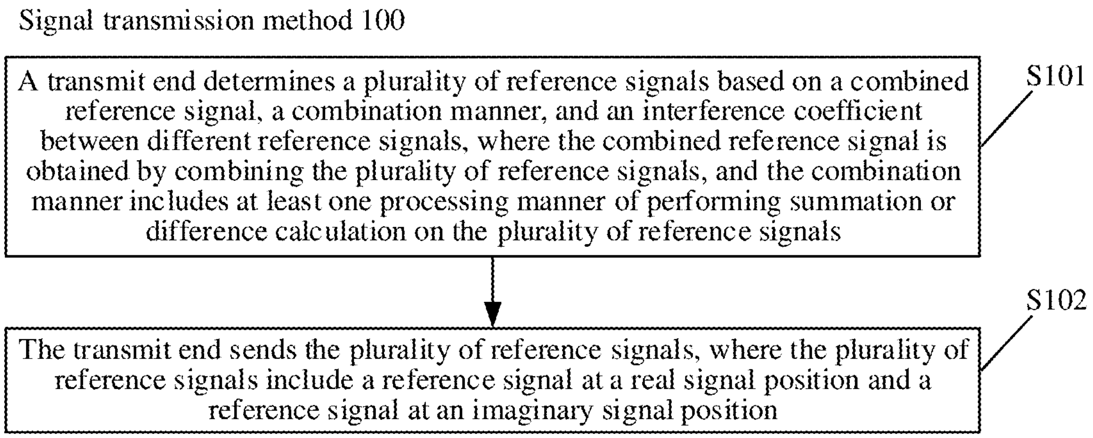
FIG. 14 is an example schematic flowchart of a signal transmission method according to an embodiment of the present disclosure.

An embodiment of the present disclosure provides a signal transmission method 100. FIG. 14 is a schematic flowchart of the signal transmission method 100. The signal transmission method 100 is described from a transmit end. The signal transmission method 100 includes but is not limited to the following steps.

S101: The transmit end determines a plurality of reference signals based on a combined reference signal, a combination manner, and an interference coefficient between different reference signals. The combined reference signal is obtained by combining the plurality of reference signals. The combination manner includes at least one processing manner of performing summation or difference calculation on the plurality of reference signals.

S102: The transmit end sends the plurality of reference signals, where the plurality of reference signals includes a reference signal at a real signal position and a reference signal at an imaginary signal position.

It may be understood that the combined reference signal is obtained by combining a plurality of reference signals that pass through a channel, and the plurality of reference signals determined by the transmit end are a plurality of reference signals that do not pass through a channel. The plurality of reference signals may be PTRSs, and the plurality of reference signals are used by the transmit end to perform phase noise estimation.

In an optional implementation, the plurality of reference signals belongs to a same reference signal block. The same reference signal block includes consecutively placed reference signals, or includes adjacent reference signals. It can be learned that the plurality of reference signal blocks determined by the transmit end are a plurality of reference signals that belong to one reference signal block and that are consecutively placed or adjacent to each other. For example, if a network device configures a PTRS block #A, and the PTRS block #A includes a PTRS #1 and a PTRS #2, the plurality of reference signals determined by the transmit end include the PTRS #1 and the PTRS #2.

In an optional implementation, the plurality of reference signals are offset quadrature amplitude modulation OQAM signals. In other words, the transmit end determines the plurality of offset quadrature amplitude modulation reference signals, so that the reference signal can have a reduced PAPR.

In addition, it can be learned from the foregoing descriptions that the OQAM signals include the reference signal at the real signal position and the reference signal at the imaginary signal position. Therefore, the plurality of reference signals includes the reference signal at the real signal position and the reference signal at the imaginary signal position.

In an optional implementation, the combination manner includes performing combination processing on the plurality of reference signals based on a coding vector. When an element in the coding vector is 1, it indicates to perform summation processing on two adjacent reference signals in the plurality of reference signals; or when an element in the coding vector is −1, it indicates to perform difference calculation processing on two adjacent reference signals in the plurality of reference signals. It can be learned that the combined reference signal is obtained by performing at least one of summation processing and difference calculation processing on the plurality of reference signals based on the element in the coding vector.

For example, one reference signal block includes two reference signals, reference signals obtained by the two reference signals passing through a channel are respectively y1 and y2, and the coding vector is $$\begin{bmatrix} 1 \\ 1 \end{bmatrix}.$$

It can be learned that, if all elements in the coding vector are 1, it indicates that the combined reference signal is obtained by performing summation processing on the reference signal y1 and the reference signal y2, that is, the combined reference signal is $y=y_1+y_2$.

For example, one reference signal block includes two reference signals, reference signals obtained by the two reference signals passing through a channel are respectively y1 and y2, and the coding vector is $$\begin{bmatrix} 1 \\ -1 \end{bmatrix}.$$

If a second element in the coding vector is −1, it indicates that the combined reference signal is obtained by performing difference calculation processing on the reference signal y1 and the reference signal y2, that is, the combined reference signal is $y=y_1-y_2$.

For example, one reference signal block includes four reference signals, the four reference signals are respectively a reference signal y1, a reference signal y2, a reference signal y3, and a reference signal y4 after passing through a channel, and the coding vector is $$\begin{bmatrix} 1 \\ -1 \\ 1 \\ -1 \end{bmatrix}.$$

Based on each element in the coding vector, it may be determined that the combined reference signal is $$y = y_1 - y_2 + y3 - y4.$$

Optionally, a value of the element in the coding vector may not be 1, and may be any other number. In other words, the value of the element in the coding vector is not limited in this embodiment. When the value of the element in the coding vector is a positive number, it indicates to perform summation processing on the reference signals; or when the value of the element in the coding vector is a negative number, it indicates to perform difference calculation processing on the reference signals.

In other words, a positive or negative value of the element in the coding vector determines whether to perform summation processing or difference calculation processing on the reference signals. Therefore, the transmit end may perform at least one of summation processing and difference calculation processing on the plurality of reference signals based on the positive or negative value of the element in the coding vector, to obtain the combined reference signal.

For example, one reference signal block includes two reference signals, the two reference signals are respectively a reference signal y1 and a reference signal y2 after passing through a channel, and the coding vector is $$\begin{bmatrix} 3 \\ -5 \end{bmatrix}.$$

In this case, it may be determined, based on the element in the coding vector, that the combined reference signal is $y=3y_1-5y_2$.

The plurality of reference signals includes the reference signal at the real signal position and the reference signal at the imaginary signal position. The following describes, based on different implementations of the reference signal at the real signal position and the reference signal at the imaginary signal position, an implementation in which the transmit end determines the plurality of reference signals.

Implementation 1: The reference signal at the real signal position is a real part signal at the real signal position, and the reference signal at the imaginary signal position is an imaginary part signal at the real signal position.

For example, one reference signal block includes two reference signals, and values of a reference signal y1 and a reference signal y2 that are obtained by the two reference signals passing through a channel are as follows:

$$y1 = (I + jQ\alpha + JISI_1)e^{j\theta_{PN}} + \text{Noise } 1 \quad (2)$$

$$y2 = (jQ + I\alpha + ISI_2)e^{j\theta_{PN}} + \text{Noise } 2 \quad (3)$$

$ISI_1$ and $ISI_2$ are respectively interference of a data signal and another reference signal that does not belong to the reference signal block to the reference signal y1 and the reference signal y2. I is a value of the real part signal, and Q is a value of the imaginary part signal. jQα is interference caused by the imaginary part signal at the imaginary signal position to the real part signal at the real signal position, and Iα is interference caused by the real part signal at the real signal position to the imaginary part signal at the imaginary signal position. $\alpha$ is an interference coefficient, or is a filter coefficient. $e^{j\theta_{PN}}$ is phase noise. Noise1 and Noise2 are respectively noise in a propagation channel when the real part signal and the imaginary part signal are propagated.

If the coding vector is $$\begin{bmatrix} 1 \\ 1 \end{bmatrix},$$

after the reference signal y1 and the reference signal y2 are combined based on the coding vector, the obtained combined reference signal is as follows:

$$y1+y2=[(ISI_2+I\alpha+I)+j(ISI_1+Q\alpha+Q)]e^{j\theta_{PN}}+Noise1+Noise2 \quad (4)$$

It is assumed that $ISI_2+I\alpha+I=C1$, and $ISI_1+Q\alpha+Q=C2$, where C1 and C2 are specific values, and positive or negative signs of C1 and C2 may be specified. In this case, the combined reference signal may be expressed as follows:

$$y1+y2=[C1+jC2]e^{j\theta_{PN}}+\text{Noise} \quad (5)$$

Noise includes Noise1 and Noise2.

It can be learned from the formula (5) that C1 is a real part of a value of the combined reference signal, and C2 is an imaginary part of a value of the combined reference signal. Therefore, it may be understood as that the real part of the value of the combined reference signal is a first preset value, and the imaginary part of the value of the combined reference signal is a second preset value. Alternatively, an amplitude value of the real part of the value of the combined reference signal is a first preset value, and an amplitude value of the imaginary part of the value of the combined reference signal is a second preset value.

It can be learned that after the plurality of reference signals are combined, both the real part and the imaginary part of the value of the combined reference signal are preset values, or both the amplitude value of the real part and the amplitude value of the imaginary part of the value of the combined reference signal are preset values, so that the transmit end can determine the combined reference signal based on the combination manner and the preset value.

The first preset value and the second preset value are set by the network device. Alternatively, the first preset value and the second preset value are reported by a terminal device to the network device. Alternatively, the first preset value and the second preset value are predefined by a terminal device and the network device. Alternatively, the first preset value and the second preset value are determined based on a modulation scheme. Alternatively, the first preset value and the second preset value are determined based on a modulation and coding scheme (MCS). That is, the transmit end may flexibly determine the first preset value (C1) and the second preset value (C2) in a plurality of manners.

In this embodiment, a value of C1 may be equal to a value of C2. Optionally, the value of C1 is not equal to the value of C2. This is not limited in this embodiment.

The transmit end may determine, based on the foregoing equivalent formula of C1 and C2, that values of I and Q are respectively as follows:

$$I=(\pm C1-ISI_2)/(1+\alpha) \quad (6)$$

$$Q=(\pm C2-ISI_1)/(1+\alpha) \quad (7)$$

It can be learned that the transmit end may determine, based on the formula (6) and the formula (7), that the real part signal at the real signal position is $(\pm C1-ISI_2)/(1+\alpha)$, and the imaginary part signal at the imaginary signal position is $(\pm C2-ISI_1)/(1+\alpha)j$, in other words, the transmit end determines the real part signal at the real signal position and the imaginary part signal at the imaginary signal position.

It can be learned from the foregoing derivation that C1 and C2 are assumed based on the combined reference signal and the combination manner of combining the plurality of reference signals, and the values of I and Q each further include an interference coefficient $\alpha$ between different reference signals. Therefore, the transmit end determines the real part signal at the real signal position and the imaginary part signal at the imaginary signal position based on the combined reference signal, the combination manner of the plurality of reference signals, and the interference coefficient between the different reference signals.

In an optional implementation, the value of the element in the coding vector is determined based on the interference coefficient between the different reference signals, in other words, the combination manner of combining the plurality of reference signals is determined based on the interference coefficient between the different reference signals. For example, when an interference coefficient between the reference signal y1 and the reference signal y2 is positive, the coding vector is $$\begin{bmatrix} 1 \\ 1 \end{bmatrix},$$

to deduce: $I=(\pm C1-ISI_2)/(1+\alpha)$ and $Q=(\pm C2-ISI_1)/(1+\alpha)$. For another example, when an interference coefficient between the reference signal y1 and the reference signal y2 is negative, the coding vector is $$\begin{bmatrix} 1 \\ -1 \end{bmatrix},$$

to deduce: $I=(\pm C1-ISI_2)/(1-\alpha)$ and $Q=(\pm C2-ISI_2)/(1-\alpha)$.

For another example, one reference signal block includes four reference signals, real part reference signals are y1 and y3, and imaginary part reference signals are y3 and y4. In this case, the value of the element in the coding vector is determined based on two-level interference coefficients between the four reference signals, an interference coefficient between y1 and y2 is a first-level interference coefficient $\alpha 1$, and an interference coefficient between y1 and y4 is a second-level interference coefficient $\alpha 2$. It can be learned that more reference signals in one reference signal block indicate more interference coefficients considered for determining the value of the element in the coding vector. For example, when both $\alpha 1$ and $\alpha 2$ are positive numbers, the coding vector may be $$\begin{bmatrix}1\\1\\1\\1\end{bmatrix};$$

or when α1 and α2 are respectively a negative number and a positive number, the coding vector may be $$\begin{bmatrix}1\\-1\\1\\-1\end{bmatrix},$$

or may be $$\begin{bmatrix}1\\1\\-1\\-1\end{bmatrix};$$

or when both α1 and α2 are negative numbers, the coding vector may be $$\begin{bmatrix}1\\-1\\-1\\1\end{bmatrix}.$$

Optionally, the value of the element in the coding vector may alternatively be determined in a manner of performing zero padding on a frequency domain signal of the reference signal. For example, one reference signal block includes two reference signals. When the transmit end performs zero padding on two ends of the frequency domain signal of the reference signal, an interference coefficient between the reference signals is positive, and the coding vector is $$\begin{bmatrix}1\\1\end{bmatrix};$$

or when the transmit end performs zero padding on the middle of the frequency domain signal of the reference signal, an interference coefficient is negative, and the coding vector is $$\begin{bmatrix}1\\-1\end{bmatrix}.$$

An amplitude value of the element in the coding vector may be set by the network device, or may be predefined by the network device, or may be reported by the terminal device.

Based on the foregoing formula (6) and formula (7), if both values of the real part signal and the imaginary part signal are reduced by 1+α, power of the reference signal may be reduced by $(1+\alpha)^2$, thereby reducing a PAPR of a system.

In an optional implementation, the real part of the value of the combined reference signal and a real part of a value of interference to the combined reference signal have a same polarity. The imaginary part of the value of the combined reference signal and an imaginary part of the value of the interference to the combined reference signal have a same polarity. In other words, the real part of the value of the combined reference signal and the real part of the value of the interference to the combined reference signal have a same positive or negative sign. The imaginary part of the value of the combined reference signal and the imaginary part of the value of the interference to the combined reference signal have a same positive or negative sign.

For example, for the foregoing formulas (5), (6), and (7), if the value $ISI_2$ of the interference to the combined reference signal is a positive number, the real part C1 of the value of the combined reference signal is also a positive number, and $I=(C1-ISI_2)/(1+\alpha)$. If the value $ISI_1$ of the interference to the combined reference signal is a positive number, the imaginary part C2 of the value of the combined reference signal is also a positive number, and $Q=(C2-ISI_2)/(1+\alpha)$. C1 and C2 are values greater than or equal to 0.

For example, for the foregoing formulas (5), (6), and (7), if the value $ISI_2$ of the interference to the combined reference signal is a negative number, the real part C1 of the value of the combined reference signal is also a negative number, and $I=(-C1-ISI_2)/(1+\alpha)$. If the value $ISI_1$ of the interference to the combined reference signal is a negative number, the imaginary part C2 of the value of the combined reference signal is also a negative number, and $Q=(-C2-ISI_2)/(1+\alpha)$. C1 and C2 are values greater than or equal to 0.

It can be learned that, in this manner, both the values of I and Q may be smaller, so that the power of the reference signal and the PAPR of the system can be further reduced.

Implementation 2: Both the reference signal at the real signal position and the reference signal at the imaginary signal position are complex signals.

For example, if one reference signal block includes two reference signals, two reference signals obtained by the two reference signals passing through a channel are respectively y1 and y2.

$$y1 = (I + jB + B\alpha + jQ\alpha + ISI_1)\, e^{j\theta_{PN}} + Noise1 \tag{8}$$

$$y2 = (B + jQ + I\alpha + jA\alpha + ISI_2)\, e^{j\theta_{PN}} + Noise2 \tag{9}$$

If the combined reference signal is obtained by performing summation processing on the two reference signals, the combined reference signal is as follows:

$$y1 + y2 = [(ISI_2 + I\alpha + I + B\alpha + B) + j\,(ISI_1 + Q\alpha + Q + A + A\alpha)]\, e^{j\theta_{PN}} + Noise1 + Noise2 \tag{10}$$

It is assumed that $ISI_2+I\alpha+I+B\alpha+B=C1$, and $ISI_1+Q\alpha+Q+A+A\alpha=C2$. In this case, the combined reference signal may be expressed as follows:

$$y1 + y2 = [C1 + jC2]\, e^{j\theta_{PN}} + \text{Noise} \tag{11}$$

Noise includes Noise1 and Noise2.

It can be learned that C1 is a real part of a value of the combined reference signal, and C2 is an imaginary part of the value of the combined reference signal.

Therefore, the real part of the value of the combined reference signal is a first preset value, and the imaginary part of the value of the combined reference signal is a second preset value. Alternatively, an amplitude value of the real part of the value of the combined reference signal is a first preset value, and an amplitude value of the imaginary part of the value of the combined reference signal is a second preset value.

For implementations of the first preset value and the second preset value, refer to the foregoing descriptions.

Based on an equivalent formula of C1 and C2, the transmit end may determine that a value of the complex signal at the real signal position and a value of the complex signal at the imaginary signal position are respectively as follows:

$$I+B=(\pm C1-ISI_2)/(1+\alpha) \tag{12}$$

$$Q+A=(\pm C2-ISI_1)/(1+\alpha) \tag{13}$$

It can be learned that the transmit end may determine the complex signal at the real signal position and the complex signal at the imaginary signal position based on the formula (12) and the formula (13). To be specific, the transmit end may determine the complex signal at the real signal position and the complex signal at the imaginary signal position based on the combined reference signal, the combination manner, and the interference coefficient between the different reference signals.

In this implementation, for an implementation of the combination manner and the coding vector, refer to the implementation in the embodiment 1.

For the formulas (12) and (13), it is assumed that C1=C2=1, α=0.6, I=B, Q=A, and $ISI_2=ISI_1=0$. In this case, I=B=Q=A=0.3125 Therefore, it may be obtained that transmit power of the reference signal is $I^2+A^2=0.3125*0.3125*2=0.1954$, and the transmit power of the reference signal in the implementation 1 is $A^2+B^2=0.625*0.625=0.3906$. In other words, compared with the foregoing implementation 1, in this manner, the transmit power of the reference signal is reduced by a half, and therefore, a PAPR of a system is also reduced by a half. It can be learned that, compared with the implementation 1, in the implementation 2, the system has a lower PAPR.

However, ISI1 and ISI2 are unknown. Therefore, I is not equal to B, and Q is not equal to A. A and B may be some fixed values, and positive or negative values of A and B are the same as a positive or negative value of C.

In an optional implementation, an amplitude value of an imaginary part signal in the complex signal at the real signal position and an amplitude value of a real part signal in the complex signal at the imaginary signal position are third preset values, that is, both values of A and B may be the third preset values. The third preset value may be set by the network device, or reported by a terminal device, or predefined, or determined based on a modulation scheme, or determined based on a modulation and coding scheme (MCS).

It may be understood that, when the transmit end is a terminal device, the network device may set the values of A and B for the terminal device. The values of A and B may be equal or not equal. For example, the network device sets the values of A and B for the terminal device through radio resource control (RRC) or by using downlink control information (DCI). Optionally, the network device sets value ranges of A and B for the terminal device, and then the network device indicates the values of A and B to the terminal device by using the DCI. Optionally, when the transmit end is a network device, the terminal device may report the values of A and B to the network device. Optionally, the network device and the terminal device predefine the values of A and B. Positive or negative signs of A and B may be determined based on C1 and C2.

In an optional implementation, the values of A and B are determined based on modulation schemes of a plurality of reference signals. To be specific, when the modulation schemes of the plurality of reference signals are different, A and B have different values. For example, as shown in the following Table 4, when the modulation schemes of the plurality of reference signals are QPSK, the value of A is A1, and the value of B is B1; or when the modulation schemes of the plurality of reference signals are 16-QAM, the value of A is A2, and the value of B is B2; or when the modulation schemes of the plurality of reference signals are 64-QAM, the value of A is A3, and the value of B is B3. In addition, as a modulation order increases, the values of A and B increase, that is, $A_3>A_2>A_1$, and $B_3>B_2>B_1$. When the values of A and B are equal, there may be only one value of A.

TABLE 4

| Modulation scheme | Value of A | Value of B |
|---|---|---|
| QPSK | A1 | B1 |
| 16-QAM | A2 | B2 |
| 64-QAM | A3 | B3 |

In an optional implementation, the real part of the value of the combined reference signal and a real part of a value of interference to the combined reference signal have a same polarity. The imaginary part of the value of the combined reference signal and an imaginary part of the value of the interference to the combined reference signal have a same polarity. For this implementation, refer to the foregoing implementation 1.

Optionally, in the foregoing two implementations, if one reference signal block includes a plurality of reference signals, the transmit end may perform combination processing on some of the reference signals, to obtain a combined reference signal corresponding to these reference signals. For example, when one reference signal block includes four reference signals, two of the four reference signals may be combined. For another example, when one reference signal block includes six reference signals, two of the six reference signals may be combined, or three of the six reference signals may be combined.

Optionally, when the terminal device is a transmit end, the plurality of reference signals may be from a plurality of terminal devices, so that the combined reference signal is obtained by combining the plurality of reference signals from the plurality of terminal devices. In other words, in this embodiment, multiplexing of the plurality of reference signals from the plurality of terminal devices can be supported, so that interference between the terminal devices can be reduced.

Figure 15:
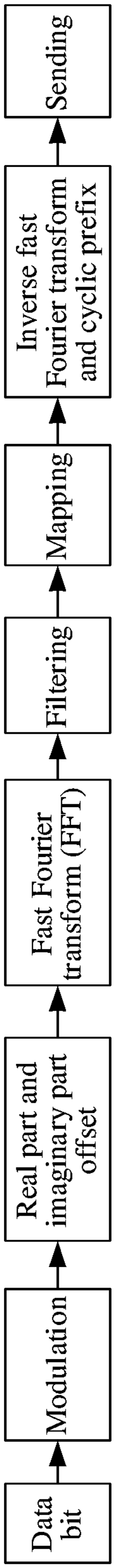
FIG. 15 is an example schematic flowchart of sending a plurality of reference signals by a transmit end according to an embodiment of the present disclosure.

In this embodiment, FIG. 15 is a flowchart of sending the plurality of reference signals by the transmit end. It can be learned from FIG. 15 that, after modulating a data bit, the transmit end performs real part and imaginary part offset on a signal, in other words, separates the imaginary part and the real part of the signal. The transmit end then performs FFT transform on a separated signal, and then uses a filter to perform filtering processing, to truncate a redundant signal. The transmit end then maps the signal to a frequency domain subcarrier, that is, performs mapping. The transmit end then performs IFFT transform on the subcarrier after the mapping, adds a CP to a transformed signal, to obtain a sent reference signal, and finally sends the reference signal to a receive end.

It can be learned that in this embodiment, when determining the plurality of reference signals, the transmit end considers at least one processing process of performing summation or difference calculation on the plurality of reference signals, so that the real part signal is determined by using interference energy, namely, Ix between another reference signal and the real part signal, and the imaginary part signal is determined by using interference energy, namely, Qu, between another reference signal and the imaginary part signal. The used interference energy is determined based on the interference coefficients, to reduce the power of the reference signal and reduce the PAPR of the system.

Currently, when designing a PTRS as an SC-OQAM signal, the transmit end may further design a real-number PTRS as a fixed value, so that a value of interference of the real-number PTRS to an imaginary-number PTRS is zero. In other words, the interference to the imaginary-number PTRS is canceled by designing the value of the real-number PTRS. Therefore, the receive end may estimate phase noise by using the imaginary-number PTRS. However, in this manner, the value of the real-number PTRS is excessively large, and consequently, the system has a large PAPR. It can be learned that, compared with this manner, in this embodiment, the value of the reference signal can be reduced, thereby reducing the PAPR of the system.

Figure 16:
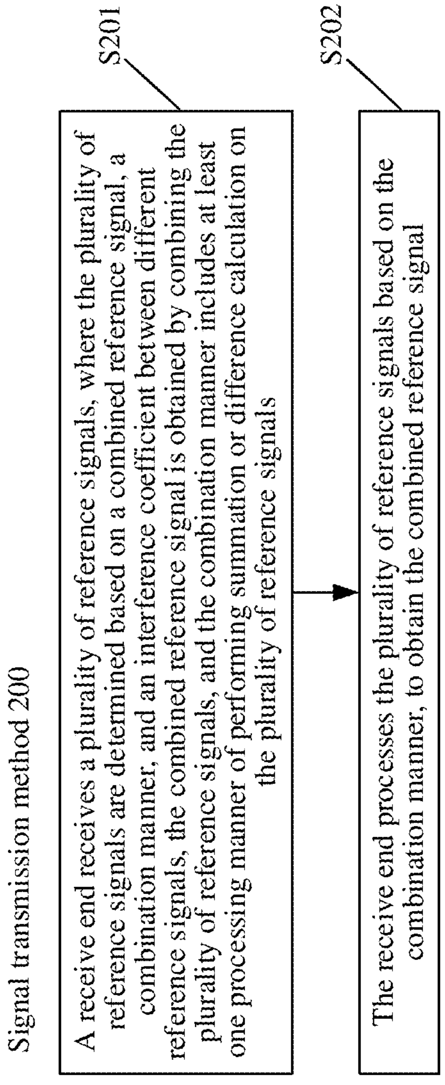
FIG. 16 is an example schematic flowchart of another signal transmission method according to an embodiment of the present disclosure.

An embodiment of the present disclosure provides a signal transmission method 200. FIG. 16 is a schematic flowchart of the signal transmission method 200. The signal transmission method 200 is described from a receive end. The signal transmission method 200 includes but is not limited to the following steps.

S201: The receive end receives a plurality of reference signals, where the plurality of reference signals are determined based on a combined reference signal, a combination manner, and an interference coefficient between different reference signals, the combined reference signal is obtained by combining the plurality of reference signals, and the combination manner includes at least one processing manner of performing summation or difference calculation on the plurality of reference signals.

S202: The receive end processes the plurality of reference signals based on the combination manner, to obtain the combined reference signal.

In this embodiment, for implementations of the combined reference signal, the combination manner, and the plurality of reference signals, refer to the implementation in the signal transmission method 100.

Figure 17:
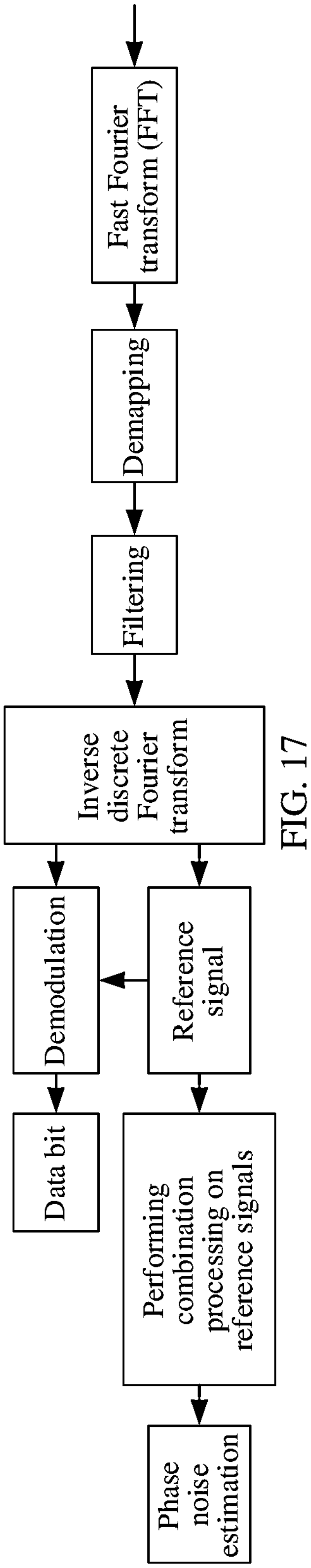
FIG. 17 is an example schematic flowchart of receiving a plurality of reference signals by a receive end according to an embodiment of the present disclosure.

In this embodiment, FIG. 17 is a schematic flowchart of receiving the plurality of reference signals by the receive end. It can be learned from FIG. 17 that, after receiving the plurality of signals, the receive end removes a cyclic prefix of the received signal, performs FFT transform on the received signal, transforms the signal from a time domain to a frequency domain, and then performs demapping and filtering processing on a transformed signal. The receive end then performs IDFT transform on a filtered signal. A transmit end performs demodulation processing on a data signal obtained through IDFT transform, to obtain a data bit. The receive end performs combination processing on the plurality of reference signals obtained through IDFT transform, to obtain the combined reference signal, and finally the receive end performs phase noise estimation based on the combined reference signal.

In an optional implementation, if the reference signals received by the receive end are the reference signals determined based on the implementation 2 in the signal transmission method 100, to be specific, the received reference signals are a complex signal at a real signal position and a complex signal at an imaginary signal position, after performing phase noise estimation, the receive end further needs to eliminate interference of an imaginary part signal in the complex signal at the real signal position to an imaginary part signal in the complex signal at the imaginary signal position, and interference of a real part signal in the complex signal at the imaginary signal position to an imaginary part signal in the complex signal at the imaginary signal position, to ensure accuracy of the phase noise estimation.

It can be learned that, in this embodiment, when the plurality of reference signals received by the receive end are determined, at least one processing process of performing summation or difference calculation on the plurality of reference signals is considered, so that each reference signal is determined by using interference energy caused by an interference coefficient between another reference signal and the reference signal. Therefore, each signal has low power, and the signal has a low PAPR. In this way, precision of phase noise estimation performed by the receive end based on the combined reference signal obtained based on the plurality of reference signals is improved. In addition, in this embodiment, a plurality of reference signal ports is supported, and may be used for estimation of a plurality of pieces of phase noise.

4. Apparatus Embodiment

To implement the functions in the method provided in the foregoing embodiments of the present disclosure, a transmit end or a receive end may include a hardware structure and/or a software module, to implement the functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Figure 18:
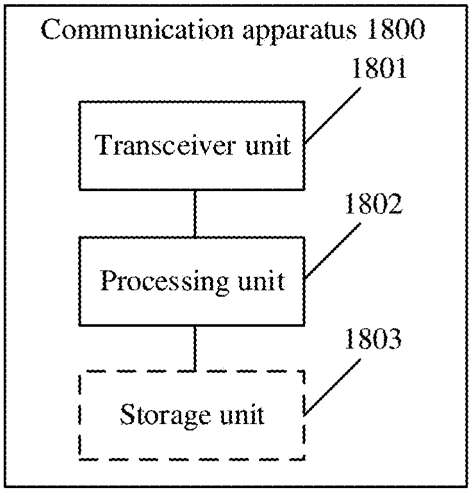
FIG. 18 is an example diagram of a structure of a communication apparatus according to an embodiment of the present disclosure.

As shown in FIG. 18, an embodiment of the present disclosure provides a communication apparatus 1800. The communication apparatus 1800 may be a component (for example, an integrated circuit or a chip) at a transmit end, or may be a component (for example, an integrated circuit or a chip) at a receive end. Alternatively, the communication apparatus 1800 may be another transceiver unit, configured to implement the method in method embodiments of the present disclosure. The communication apparatus 1800 may include a transceiver unit 1801 and a processing unit 1802. Optionally, the communication apparatus may further include a storage unit 1803.

In an example embodiment, one or more units in FIG. 18 may be implemented by one or more processors, or one or more processors and memories; or may be implemented by one or more processors and transceivers; or may be implemented by one or more processors, memories, and transceivers. This is not limited in this embodiment. The processor, the memory, and the transceiver may be disposed separately, or may be integrated.

The communication apparatus 1800 has a function of implementing the transmit end described in embodiments of the present disclosure. Optionally, the communication apparatus 1800 has a function of implementing the receive end described in embodiments of the present disclosure. For example, the communication apparatus 1800 includes a corresponding module, unit, or means used for the transmit end to perform the steps that are related to the transmit end and that are described in embodiments of the present disclosure. The function, the unit, or the means may be implemented by software or hardware, may be implemented by hardware executing corresponding software, or may be implemented by a combination of software and hardware. For details, refer to the corresponding descriptions in the foregoing corresponding method embodiment.

In an example embodiment, a communication apparatus 1800 may include a processing unit 1802 and a transceiver unit 1801. The processing unit 1802 is configured to control the transceiver unit 1801 to receive and send data/signaling.

The processing unit 1802 is configured to determine a plurality of reference signals based on a combined reference signal, a combination manner, and an interference coefficient between different reference signals. The combined reference signal is obtained by combining the plurality of reference signals. The combination manner includes at least one processing manner of performing summation or difference calculation on the plurality of reference signals.

The transceiver unit 1801 is further configured to send the plurality of reference signals. The plurality of reference signals includes a reference signal at a real signal position and a reference signal at an imaginary signal position.

In an optional implementation, the combination manner includes performing combination processing on the plurality of reference signals based on a coding vector. When an element in the coding vector is 1, it indicates to perform summation processing on two adjacent reference signals in the plurality of reference signals; or when an element in the coding vector is −1, it indicates to perform difference calculation processing on two adjacent reference signals in the plurality of reference signals.

In an optional implementation, the plurality of reference signals belongs to a same reference signal block. The same reference signal block includes consecutively placed reference signals, or includes adjacent reference signals.

In an optional implementation, a real part of a value of the combined reference signal and a real part of a value of interference to the combined reference signal have a same polarity. An imaginary part of the value of the combined reference signal and an imaginary part of the value of the interference to the combined reference signal have a same polarity.

In an optional implementation, the real part of the value of the combined reference signal is a first preset value, and the imaginary part of the value of the combined reference signal is a second preset value; or an amplitude value of the real part of the value of the combined reference signal is a first preset value, and an amplitude value of the imaginary part of the value of the combined reference signal is a second preset value. The first preset value and the second preset value are set by a network device, or reported by a terminal device, or predefined, or determined based on a modulation scheme, or determined based on a modulation and coding scheme (MCS).

In an optional implementation, both the reference signal at the real signal position and the reference signal at the imaginary signal position are complex signals.

In an optional implementation, an amplitude value of an imaginary part signal in the complex signal at the real signal position and an amplitude value of a real part signal in the complex signal at the imaginary signal position are third preset values.

In an optional implementation, the amplitude value of the imaginary-number signal in the complex signal at the real signal position and the amplitude value of the real-number signal in the complex signal at the imaginary signal position are set by the network device, or reported by the terminal device, or predefined, or determined based on the modulation scheme, or determined based on the modulation and coding scheme (MCS).

In an optional implementation, the plurality of reference signals is offset quadrature amplitude modulation signals.

This embodiment and the foregoing method embodiment are based on a same concept, and bring same technical effects. For a specific principle, refer to the descriptions of the foregoing embodiment.

In another example embodiment, a communication apparatus 1800 may include a processing unit 1802 and a transceiver unit 1801. The processing unit 1802 is configured to control the transceiver unit 1801 to receive and send data/signaling.

The transceiver unit 1801 is configured to receive a plurality of reference signals. The plurality of reference signals is determined based on a combined reference signal, a combination manner, and an interference coefficient between different reference signals. The combined reference signal is obtained by combining the plurality of reference signals. The combination manner includes at least one processing manner of performing summation or difference calculation on the plurality of reference signals. The processing unit 1802 is configured to process the plurality of reference signals based on the combination manner, to obtain the combined reference signal.

In an optional implementation, the combination manner includes performing combination processing on the plurality of reference signals based on a coding vector. When an element in the coding vector is 1, it indicates to perform summation processing on two adjacent reference signals in the plurality of reference signals; or when an element in the coding vector is −1, it indicates to perform difference calculation processing on two adjacent reference signals in the plurality of reference signals.

In an optional implementation, the plurality of reference signals belongs to a same reference signal block. The same reference signal block includes consecutively placed reference signals, or includes adjacent reference signals.

In an optional implementation, a real part of a value of the combined reference signal and a real part of a value of interference to the combined reference signal have a same polarity. An imaginary part of the value of the combined reference signal and an imaginary part of the value of the interference to the combined reference signal have a same polarity.

In an optional implementation, the real part of the value of the combined reference signal is a first preset value, and the imaginary part of the value of the combined reference signal is a second preset value; or an amplitude value of the real part of the value of the combined reference signal is a first preset value, and an amplitude value of the imaginary part of the value of the combined reference signal is a second preset value. The first preset value and the second preset value are set by a network device, or reported by a terminal device, or predefined, or determined based on a modulation scheme, or determined based on a modulation and coding scheme (MCS).

In an optional implementation, both a reference signal at a real signal position and a reference signal at an imaginary signal position are complex signals.

In an optional implementation, an amplitude value of an imaginary part signal in the complex signal at the real signal position and an amplitude value of a real part signal in the complex signal at the imaginary signal position are third preset values.

In an optional implementation, the amplitude value of the imaginary-number signal in the complex signal at the real signal position and the amplitude value of the real-number signal in the complex signal at the imaginary signal position are set by the network device, or reported by the terminal device, or predefined, or determined based on the modulation scheme, or determined based on the modulation and coding scheme (MCS).

In an optional implementation, the plurality of reference signals is offset quadrature amplitude modulation signals.

This embodiment and the foregoing method embodiment are based on a same concept, and bring same technical effects. For a specific principle, refer to the descriptions of the foregoing embodiment.

Figure 19:
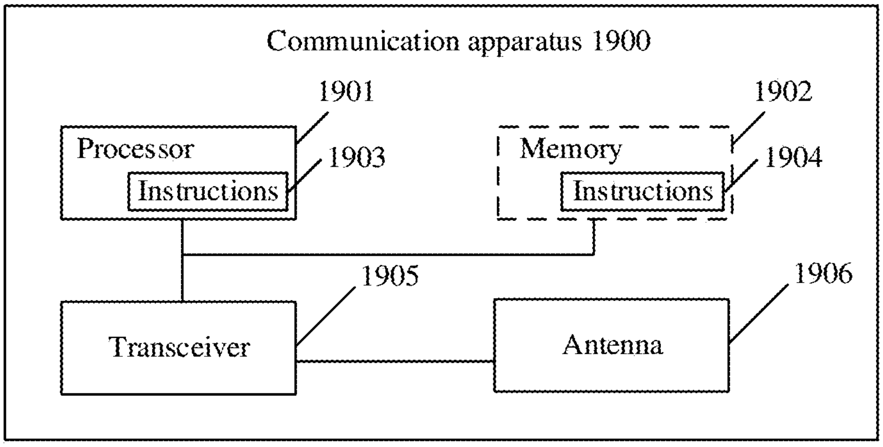
FIG. 19 is an example diagram of a structure of another communication apparatus according to an embodiment of the present disclosure.

An embodiment of the present disclosure further provides a communication apparatus 1900. FIG. 19 is a diagram of a structure of the communication apparatus 1900. The communication apparatus 1900 may be a transmit end or a receive end, or may be a chip, a chip system, a processor, or the like that supports the transmit end in implementing the foregoing method, or may be a chip, a chip system, a processor, or the like that supports the receive end in implementing the foregoing method. The apparatus may be configured to implement the method described in the foregoing method embodiment. For details, refer to the descriptions in the foregoing method embodiment.

The communication apparatus 1900 may include one or more processors 1901. The processor 1901 may be a general-purpose processor, a dedicated processor, or the like. For example, the processor may be a baseband processor, a digital signal processor, an application-specific integrated circuit, a field programmable gate array or another programmable logic device, a discrete gate or a transistor logic device, a discrete hardware component, or a central processing unit (CPU). The baseband processor may be configured to process a communication protocol and communication data. The central processing unit may be configured to: control the communication apparatus (for example, a base station, a baseband chip, a terminal, a terminal chip, a distributed unit (DU), or a central unit (CU)), execute a software program, and process data of the software program.

Optionally, the communication apparatus 1900 may include one or more memories 1902. The memory may store instructions 1904. The instructions may be run on the processor 1901, to enable the communication apparatus 1900 to perform the method described in the foregoing method embodiments. Optionally, the memory 1902 may further store data. The processor 1901 and the memory 1902 may be separately disposed, or may be integrated together.

The memory 1902 may include but is not limited to a non-volatile memory such as a hard disk drive (HDD) or a solid-state drive (SSD), a random access memory (RAM), an erasable programmable read-only memory (EPROM), a ROM, or a portable read-only memory (Compact Disc Read-Only Memory, CD-ROM).

Optionally, the communication apparatus 1900 may further include a transceiver 1905 and an antenna 1906. The transceiver 1905 may be referred to as a transceiver unit, a transceiver machine, a transceiver circuit, or the like, and is configured to implement a transceiver function. The transceiver 1905 may include a receiver and a transmitter. The receiver may be referred to as a receiver machine, a receiver circuit, or the like, and is configured to implement a receiving function. The transmitter may be referred to as a transmitter machine, a transmitter circuit, or the like, and is configured to implement a sending function.

When the communication apparatus 1900 is a transmit end, the transceiver 1905 is configured to perform S102 in the signal transmission method 100, and the processor 1901 is configured to perform S101 in the signal transmission method 100.

When the communication apparatus 1900 is a receive end, the transceiver 1905 is configured to perform S201 in the signal transmission method 200, and the processor 1901 is configured to perform S202 in the signal transmission method 200.

In another example embodiment, the processor 1901 may include a transceiver configured to implement receiving and sending functions. For example, the transceiver may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In still another example embodiment, optionally, the processor 1901 may store instructions 1903. When the instructions 1903 are run on the processor 1901, the communication apparatus 1900 may be enabled to perform the method described in the foregoing method embodiments. The instructions 1903 may be fixed in the processor 1901. In this case, the processor 1901 may be implemented by using hardware.

In still another example embodiment, the communication apparatus 1900 may include a circuit. The circuit may implement a sending, receiving, or communication function in the foregoing method embodiments. The processor and the transceiver described in embodiments of the present disclosure may be implemented on an integrated circuit (IC), an analog IC, a radio frequency integrated circuit (RFIC), a mixed-signal IC, an application-specific integrated circuit (ASIC), a printed circuit board (PCB), an electronic device, or the like. The processor and the transceiver may alternatively be manufactured by using various IC technologies, for example, a complementary metal oxide semiconductor (CMOS), an nMetal-oxide-semiconductor (NMOS), a positive channel metal oxide semiconductor (PMOS), a bipolar junction transistor (BJT), a bipolar CMOS (BICMOS), silicon germanium (SiGe), and gallium arsenide (GaAs).

The communication apparatus described in the foregoing embodiment may be a first communication apparatus or a second communication apparatus. However, a scope of the communication apparatus described in this embodiment is not limited thereto, and a structure of the communication apparatus may not be limited by FIG. 19. The communication apparatus may be an independent device or may be a part of a large device. For example, the communication apparatus may be:

(1) an independent integrated circuit IC, a chip, or a chip system or subsystem;

(2) a set that has one or more ICs, where optionally, the IC set may alternatively include a storage component configured to store data and instructions;

(3) an ASIC, like a modem (modulator);

(4) a module that can be embedded in another device;

(5) a receiver, a terminal, an intelligent terminal, a cellular phone, a wireless device, a handheld device, a mobile unit, a vehicle-mounted device, a network device, a cloud device, an artificial intelligence device, or the like; or (6) others.

Figure 20:
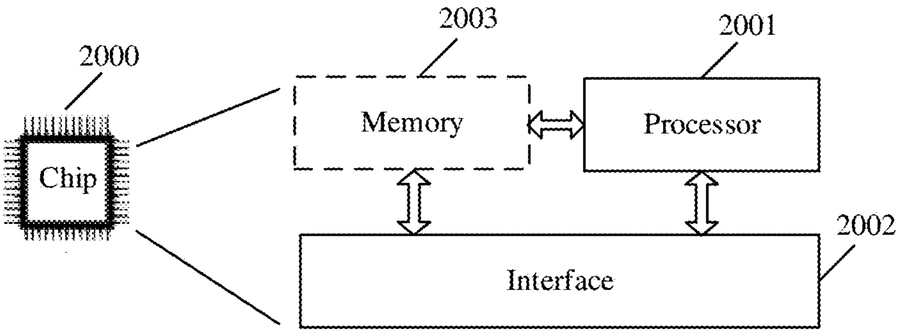
FIG. 20 is an example diagram of a structure of a chip according to an embodiment of the present disclosure.

For a case in which the communication apparatus may be a chip or a chip system, refer to a diagram of a structure of a chip shown in FIG. 20. The chip 2000 shown in FIG. 20 includes a processor 2001 and an interface 2002. There may be one or more processors 2001, and there may be a plurality of interfaces 2002. The processor 2001 may be a logic circuit, and the interface 2002 may be an input/output interface, an input interface, or an output interface. The chip 2000 may further include a memory 2003.

In an example embodiment, when the chip is configured to implement the function of the transmit end in embodiments of the present disclosure, the processor 2001 is configured to determine a plurality of reference signals based on a combined reference signal, a combination manner, and an interference coefficient between different reference signals. The combined reference signal is obtained by combining the plurality of reference signals. The combination manner includes at least one processing manner of performing summation or difference calculation on the plurality of reference signals.

The interface 2002 is configured to send the plurality of reference signals. The plurality of reference signals include a reference signal at a real signal position and a reference signal at an imaginary signal position.

In another design, when the chip is configured to implement the function of the receive end in embodiments of the present disclosure, the interface 2002 is configured to receive a plurality of reference signals. The plurality of reference signals is determined based on a combined reference signal, a combination manner, and an interference coefficient between different reference signals. The combined reference signal is obtained by combining the plurality of reference signals. The combination manner includes at least one processing manner of performing summation or difference calculation on the plurality of reference signals.

The processor 2001 is configured to process the plurality of reference signals based on the combination manner, to obtain the combined reference signal.

In this embodiment, the communication apparatus 1900 and the chip 2000 may further perform the implementations described in the communication apparatus 1800. A person skilled in the art may further understand that various illustrative logical blocks and steps that are listed in embodiments of the present disclosure may be implemented by using electronic hardware, computer software, or a combination thereof. Whether the functions are implemented by using hardware or software depends on particular applications and a design requirement of the entire system. A person skilled in the art may use various methods to implement the described functions for each particular application, but it should not be considered that the implementation goes beyond the scope of embodiments of the present disclosure.

This embodiment is based on a same concept as the method embodiments shown in the signal transmission method 100 and the signal transmission method 200, and brings a same technical effect. For a specific principle, refer to the descriptions of the embodiments shown in the signal transmission method 100 and the signal transmission method 200.

The present disclosure further provides a computer-readable storage medium, configured to store computer software instructions. When the instructions are executed by a communication apparatus, a function in any one of the foregoing method embodiments is implemented.

The present disclosure further provides a computer program product, configured to store computer software instructions. When the instructions are executed by a communication apparatus, a function in any one of the foregoing method embodiments is implemented.

The present disclosure further provides a computer program. When the computer program is run on a computer, a function in any one of the foregoing method embodiments is implemented.

The present disclosure further provides a communication system. The system includes at least one network device and at least one terminal device in the foregoing aspects. In another example embodiment, the system may further include another device that interacts with the network device and the terminal device in the solutions provided in the present disclosure.

All or some of the foregoing embodiments may be implemented by using software, hardware, firmware, or any combination thereof. When software is used for implementation, all or some of the embodiments may be implemented in a form of a computer program product. The computer program product includes one or more computer instructions. When the computer instructions are loaded and executed on a computer, the procedures or functions according to embodiments of the present disclosure are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a high-density digital video disc (DVD)), a semiconductor medium (for example, an SSD), or the like.

The foregoing descriptions are merely non-limiting examples of implementations, and are not intended to limit the protection scope, which is intended to cover any variation or replacement readily determined by a person of ordinary skill in the art. Therefore, the claims shall define the protection scope.

What is claimed is:

1. A signal transmission method, comprising:

determining, by a transmit end, a plurality of reference signals based on a combined reference signal, a combination manner, and an interference coefficient between different reference signals, wherein the combined reference signal is obtained by combining the plurality of reference signals, and the combination manner comprises at least one processing manner of performing summation or difference calculation on the plurality of reference signals; and sending, by the transmit end, the plurality of reference signals, wherein the plurality of reference signals comprises a reference signal at a real signal position and a reference signal at an imaginary signal position, wherein the combination manner comprises performing combination processing on the plurality of reference signals based on a coding vector; and when an element in the coding vector is 1, it indicates to perform summation processing on two adjacent reference signals in the plurality of reference signals or when an element in the coding vector is −1, it indicates to perform difference calculation processing on two adjacent reference signals in the plurality of reference signals.

2. The method according to claim 1, wherein the plurality of reference signals belongs to a same reference signal block comprising consecutively placed reference signals, or adjacent reference signals.

3. The method according to claim 1, wherein a real part of a value of the combined reference signal and a real part of a value of interference to the combined reference signal have a same polarity; and an imaginary part of the value of the combined reference signal and an imaginary part of the value of the interference to the combined reference signal have a same polarity.

4. The method according to claim 3, wherein the real part of the value of the combined reference signal is a first preset value, and the imaginary part of the value of the combined reference signal is a second preset value; or an amplitude value of the real part of the value of the combined reference signal is a first preset value, and an amplitude value of the imaginary part of the value of the combined reference signal is a second preset value; and the first preset value and the second preset value are set by a network device, or reported by a terminal device, or predefined, or determined based on a modulation scheme, or determined based on a modulation and coding scheme (MCS).

5. The method according to claim 1, wherein both the reference signal at the real signal position and the reference signal at the imaginary signal position are complex signals.

6. The method according to claim 5, wherein an amplitude value of an imaginary part signal in the complex signal at the real signal position and an amplitude value of a real part signal in the complex signal at the imaginary signal position are third preset values.

7. The method according to claim 6, wherein the amplitude value of the imaginary part signal in the complex signal at the real signal position and the amplitude value of the real part signal in the complex signal at the imaginary signal position are set by a network device, or reported by a terminal device, or predefined, or determined based on a modulation scheme, or determined based on a modulation and coding scheme (MCS).

8. The method according to claim 1, wherein the plurality of reference signals are offset quadrature amplitude modulation signals.

9. A signal transmission method, comprising:

receiving, by a receive end, a plurality of reference signals, wherein the plurality of reference signals are determined based on a combined reference signal, a combination manner, and an interference coefficient between different reference signals, the combined reference signal is obtained by combining the plurality of reference signals, and the combination manner comprises at least one processing manner of performing summation or difference calculation on the plurality of reference signals; and processing, by the receive end, the plurality of reference signals based on the combination manner, to obtain the combined reference signal, wherein the combination manner comprises performing combination processing on the plurality of reference signals based on a coding vector; and when an element in the coding vector is 1, it indicates to perform summation processing on two adjacent reference signals in the plurality of reference signals or when an element in the coding vector is −1, it indicates to perform difference calculation processing on two adjacent reference signals in the plurality of reference signals.

10. The method according to claim 9, wherein the plurality of reference signals belongs to a same reference signal block comprising consecutively placed reference signals or adjacent reference signals.

11. The method according to claim 9, wherein a real part of a value of the combined reference signal and a real part of a value of interference to the combined reference signal have a same polarity; and an imaginary part of the value of the combined reference signal and an imaginary part of the value of the interference to the combined reference signal have a same polarity.

12. The method according to claim 11, wherein the real part of the value of the combined reference signal is a first preset value, and the imaginary part of the value of the combined reference signal is a second preset value; or an amplitude value of the real part of the value of the combined reference signal is a first preset value, and an amplitude value of the imaginary part of the value of the combined reference signal is a second preset value; and the first preset value and the second preset value are set by a network device, or reported by a terminal device, or predefined, or determined based on a modulation scheme, or determined based on a modulation and coding scheme (MCS).

13. The method according to claim 9, wherein both a reference signal at a real signal position and a reference signal at an imaginary signal position are complex signals.

14. The method according to claim 13, wherein an amplitude value of an imaginary part signal in the complex signal at the real signal position and an amplitude value of a real part signal in the complex signal at the imaginary signal position are preset values.

15. The method according to claim 14, wherein the amplitude value of the imaginary part signal in the complex signal at the real signal position and the amplitude value of the real part signal in the complex signal at the imaginary signal position are set by a network device, or reported by a terminal device, or predefined, or determined based on a modulation scheme, or determined based on a modulation and coding scheme (MCS).

16. The method according to claim 9, wherein the plurality of reference signals are offset quadrature amplitude modulation signals.

17. A communication apparatus, comprising:

at least one processor, configured to determine a plurality of reference signals based on a combined reference signal, a combination manner, and an interference coefficient between different reference signals, wherein the combined reference signal is obtained by combining the plurality of reference signals, and the combination manner comprises at least one processing manner of performing summation or difference calculation on the plurality of reference signals; and a transceiver, configured to send the plurality of reference signals, wherein the plurality of reference signals comprises a reference signal at a real signal position and a reference signal at an imaginary signal position, wherein the combination manner comprises performing combination processing on the plurality of reference signals based on a coding vector; and when an element in the coding vector is 1, it indicates to perform summation processing on two adjacent reference signals in the plurality of reference signals; or when an element in the coding vector is −1, it indicates to perform difference calculation processing on two adjacent reference signals in the plurality of reference signals.

* * * * *